US010533639B2

(12) United States Patent
Yu et al.

(10) Patent No.: US 10,533,639 B2
(45) Date of Patent: Jan. 14, 2020

(54) AUTOMATIC TRANSMISSION

(71) Applicant: Jing-Jin Electric Technologies Co., Ltd., Beijing (CN)

(72) Inventors: Ping Yu, Beijing (CN); Ting Wang, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 230 days.

(21) Appl. No.: 15/576,719

(22) PCT Filed: Apr. 22, 2016

(86) PCT No.: PCT/CN2016/080020
§ 371 (c)(1),
(2) Date: Nov. 23, 2017

(87) PCT Pub. No.: WO2016/192484
PCT Pub. Date: Dec. 8, 2016

(65) Prior Publication Data
US 2018/0135730 A1 May 17, 2018

(30) Foreign Application Priority Data
May 29, 2015 (CN) .......................... 2015 1 0289991

(51) Int. Cl.
*F16H 3/24* (2006.01)
*F16H 3/12* (2006.01)
(Continued)

(52) U.S. Cl.
CPC ................. *F16H 3/32* (2013.01); *F16H 3/12* (2013.01); *F16H 57/023* (2013.01); *F16H 61/28* (2013.01);
(Continued)

(58) Field of Classification Search
CPC ...................................... F16H 3/24; F16H 3/12
(Continued)

(56) References Cited

U.S. PATENT DOCUMENTS 1,875,386 A    9/1932  MacKenzie
3,372,593 A    3/1968  Becker
(Continued)

FOREIGN PATENT DOCUMENTS

CN    2184538 Y    12/1994
CN    201187568 Y    1/2009
(Continued)

OTHER PUBLICATIONS

Written Opinion of the International Searching Authority dated Jul. 19, 2016 for PCT Application No. PCT/CN2016/080020.
(Continued)

*Primary Examiner* — Ha Dinh Ho
(74) *Attorney, Agent, or Firm* — Moser Taboada

(57) ABSTRACT

An automatic transmission comprises a double-contrate-tooth combined fluted disc (120) and a two stage transmission ordinary gear train. The gear shifting mechanism of the transmission is the double-contrate-tooth combined fluted disc (120), which has double contrate teeth, namely, left contrate teeth and right contrate teeth. By the axial moving of the double-contrate-tooth combined fluted disc (120) on the transmission output shaft, its left contrate teeth and right contrate teeth respectively engage with the contrate teeth of the first gear and the second gear reduction gears, to realize the second shift position and the first shift position, and when it engages with neither of them, the transmission is in the neutral shift position. The left contrate teeth and the right contrate teeth are individually independent or integrally assembled structures. Compared with the traditional AMT, the transmission does not need a synchronizer; therefore, the
(Continued)

structure is simple, the reliability is increased, the gear shift duration is shortened, the shifting shock is relatively small, the manufacturing cost is low, and it is easy to realize industrialization. The transmission has simple arrangement of gears, short axial dimension, small weight, and occupies small room, and meets the development trend of light weighting and fuel saving.

6 Claims, 6 Drawing Sheets

(51) Int. Cl.
F16H 3/32 (2006.01)
F16H 57/023 (2012.01)
F16H 61/28 (2006.01)
F16H 63/32 (2006.01)

(52) U.S. Cl.
CPC ..... *F16H 63/32* (2013.01); *F16H 2061/2853* (2013.01)

(58) Field of Classification Search
USPC .................................................. 74/325, 335
See application file for complete search history.

(56) References Cited

U.S. PATENT DOCUMENTS

| | | | | |
|---|---|---|---|---|
| 6,709,356 | B2* | 3/2004 | Fuhrer | F16H 37/046 475/207 |
| 6,805,648 | B1* | 10/2004 | Ehrlinger | B60K 6/38 475/5 |
| 7,069,799 | B2* | 7/2006 | Wafzig | F16H 3/0915 74/329 |
| 8,096,202 | B2* | 1/2012 | Komori | F16H 3/12 74/325 |
| 8,627,736 | B2* | 1/2014 | Maerkl | F16H 3/093 74/325 |

FOREIGN PATENT DOCUMENTS

| | | |
|---|---|---|
| CN | 201390152 Y | 1/2010 |
| CN | 101722838 A | 6/2010 |
| CN | 102840309 A | 12/2012 |
| CN | 203297530 U | 11/2013 |
| CN | 103899716 A | 7/2014 |
| CN | 203717803 U | 7/2014 |
| CN | 203743235 U | 7/2014 |
| CN | 103994217 A | 8/2014 |
| CN | 104930137 A | 9/2015 |
| CN | 205423703 U | 8/2016 |
| DE | 102011086134 A1 | 5/2013 |
| FR | 747331 A | 6/1933 |
| GB | 298186 A | 4/1929 |
| JP | S5491580 A | 7/1979 |
| JP | S-55097213 | 7/1980 |
| JP | S60-129428 | 7/1985 |
| JP | S-62261727 A | 11/1987 |
| JP | H04-001777 U | 4/1992 |
| JP | 2005121124 A | 5/2005 |
| JP | 2012127407 A | 7/2012 |

OTHER PUBLICATIONS

Chinese Office Action dated Feb. 4, 2017 for Application No. 201510289991.4.
Decision of Refusal dated May 1, 2018 for Japanese Patent Application No. 2017-561931.
Japanese Office Action for application No. 2017-561931, dated May 1, 2018.
European Search Report for Application No. 16802407.3 dated Oct. 17, 2018.

* cited by examiner

AUTOMATIC TRANSMISSION

TECHNICAL FIELD

The present invention relates to the field of new energy automobiles, and particularly relates to an automatic transmission.

BACKGROUND

Along with the rapid development of new energy automobiles, the requirements on the performance of an entire car, such as dynamics property, smoothness and driving range, continuously increase. In order to satisfy such requirements, the new energy power driving system must have an automatic transmission.

Presently, the automatic transmissions of new energy automobiles mostly choose to make improvements on the basis of automatic transmissions of traditional internal combustion engine automobiles. Four traditional automatic transmissions, namely, hydraulic automatic transmissions (AT), continuously variable transmissions (CVT), electrically controlled mechanic automatic transmissions (AMT) and double clutch automatic transmissions (DCT), are all used in the field of new energy automobiles.

However, these transmissions have too many shift positions, which affects the efficiency and reliability of the system. Moreover, they are relatively large and expensive, and not suitable for new energy automobiles. In the future, two-speed, three-speed or four-speed transmission will be the mainstream of new energy automobiles. Presently, the gear shifting actuating mechanisms of two-speed transmissions are electrical, pneumatic or hydraulic, which increases the cost and volume of the system, and decreases the reliability of the system to some extent.

SUMMARY

In view of the above problems, the present invention provides an automatic transmission, to solve the above problems.

An automatic transmission provided by the present invention comprises: a first double-contrate-tooth combined fluted disc 120 and a two stage transmission ordinary gear train.

Optionally, the two stage transmission ordinary gear train comprises: a transmission input shaft 100, a transmission intermediate shaft 140, a transmission output shaft 150, a first external-gear right-contrate-tooth combined gear 110, a first external-gear left-contrate-tooth combined gear 130, a first gear 111 and a second gear 131;

wherein, the transmission input shaft 100, the transmission intermediate shaft 140 and the transmission output shaft 150 are paralleled arranged; the first external-gear right-contrate-tooth combined gear 110 is fixedly connected to the transmission input shaft 100 by a key, the first external-gear right-contrate-tooth combined gear 110 and the first gear 111 engage by peripheral teeth, and the first gear 111 and the second gear 131 are individually fixedly connected to the transmission intermediate shaft 140 by a key; the second gear 131 and the first external-gear left-contrate-tooth combined gear 130 engage by peripheral teeth, and the first external-gear left-contrate-tooth combined gear 130 is loosely nested on the transmission output shaft 150; and the first double-contrate-tooth combined fluted disc 120 is installed on the transmission output shaft 150 by a key.

Optionally, the first double-contrate-tooth combined fluted disc 120 comprises left contrate teeth and right contrate teeth; the first double-contrate-tooth combined fluted disc 120 is able to turn synchronously with the transmission output shaft 150, and is able to axially move along the transmission output shaft 150;

the first external-gear right-contrate-tooth combined gear 110 further has right contrate teeth; after the first double-contrate-tooth combined fluted disc 120 moves to the left to a specified position, the right contrate teeth of the first external-gear right-contrate-tooth combined gear 110 and the left contrate teeth of the first double-contrate-tooth combined fluted disc 120 engage;

the first external-gear left-contrate-tooth combined gear 130 further has left contrate teeth; after the first double-contrate-tooth combined fluted disc 120 moves to the right to a specified position, the left contrate teeth of the first external-gear left-contrate-tooth combined gear 130 and the right contrate teeth of the first double-contrate-tooth combined fluted disc 120 engage; and when the first double-contrate-tooth combined fluted disc 120 is in an intermediate position, the first double-contrate-tooth combined fluted disc 120 neither engages with the right contrate teeth of the first external-gear right-contrate-tooth combined gear 110, nor engages with the left contrate teeth of the first external-gear left-contrate-tooth combined gear 130.

Optionally, the automatic transmission further comprises a gear-shift controlling mechanism;

the gear-shift controlling mechanism is a built-in electromagnetic actuating mechanism; or, the gear-shift controlling mechanism is an outboard hydraulic, pneumatic or electrical actuating mechanism; and when the gear-shift controlling mechanism is a built-in electromagnetic actuating mechanism, the gear-shift controlling mechanism specially comprises a first left end electromagnet and first right end electromagnet that are installed on the first double-contrate-tooth combined fluted disc 120; when the first left end electromagnet is electrified, the first double-contrate-tooth combined fluted disc 120 moves to the left to the specified position; when the first right end electromagnet is electrified, the first double-contrate-tooth combined fluted disc 120 moves to the right to the specified position.

Optionally, the intertooth spaces and tooth slots of the left contrate teeth and the right contrate teeth of the first double-contrate-tooth combined fluted disc 120, the right contrate teeth of the first external-gear right-contrate-tooth combined gear 110 and the left contrate teeth of the first external-gear left-contrate-tooth combined gear 130 are all rectangular.

Optionally, the automatic transmission further comprises: a contrate-tooth combined fluted disc 250, a second external-gear right-contrate-tooth combined gear 240 and a third gear 241;

wherein, the second external-gear right-contrate-tooth combined gear 240 has peripheral teeth and right contrate teeth, and the second external-gear right-contrate-tooth combined gear 240 is loosely nested on the transmission output shaft 150; the second external-gear right-contrate-tooth combined gear 240 and the third gear 241 engage by peripheral teeth; and the third gear 241 is fixedly connected to the transmission intermediate shaft 140 by a key;

the contrate-tooth combined fluted disc 250 comprises left contrate teeth; the contrate-tooth combined fluted disc 250 is installed on the transmission output shaft 150 by a key, and the contrate-tooth combined fluted disc 250 is able to turn synchronously with the transmission output shaft 150, and is able to axially move along the transmission output shaft 150;

after the contrate-tooth combined fluted disc 250 moves to the left to a specified position, the right contrate teeth of the second external-gear right-contrate-tooth combined gear 240 and the left contrate teeth of the contrate-tooth combined fluted disc 250 engage; and when the contrate-tooth combined fluted disc 250 is in an intermediate position, the contrate-tooth combined fluted disc 250 does not engage with the right contrate teeth of the second external-gear right-contrate-tooth combined gear 240.

Optionally, the automatic transmission further comprises: a second double-contrate-tooth combined fluted disc 350, a third external-gear right-contrate-tooth combined gear 340, a fourth gear 341, a second external-gear left-contrate-tooth combined gear 360 and a fifth gear 361;

wherein, the third external-gear right-contrate-tooth combined gear 340 has peripheral teeth and right contrate teeth, and the third external-gear right-contrate-tooth combined gear 340 is loosely nested on the transmission output shaft 150; the third external-gear right-contrate-tooth combined gear 340 and the fourth gear 341 engage by peripheral teeth; and the fourth gear 341 is fixedly connected to the transmission intermediate shaft 140 by a key;

the second external-gear left-contrate-tooth combined gear 360 has peripheral teeth and left contrate teeth, and the second external-gear left-contrate-tooth combined gear 360 is loosely nested on the transmission output shaft 150; the second external-gear left-contrate-tooth combined gear 360 and the fifth gear 361 engage by peripheral teeth; and the fifth gear 361 is fixedly connected to the transmission intermediate shaft 140 by a key;

the second double-contrate-tooth combined fluted disc 350 comprises left contrate teeth and right contrate teeth; the second double-contrate-tooth combined fluted disc 350 is installed on the transmission output shaft 150 by a key, and the second double-contrate-tooth combined fluted disc 350 is able to turn synchronously with the transmission output shaft 150, and is able to axially move along the transmission output shaft 150;

after the second double-contrate-tooth combined fluted disc 350 moves to the left to a specified position, the right contrate teeth of the third external-gear right-contrate-tooth combined gear 340 and the left contrate teeth of the second double-contrate-tooth combined fluted disc 350 engage;

after the second double-contrate-tooth combined fluted disc 350 moves to the right to a specified position, the left contrate teeth of the second external-gear left-contrate-tooth combined gear 360 and the right contrate teeth of the second double-contrate-tooth combined fluted disc 350 engage; and when the second double-contrate-tooth combined fluted disc 350 is in an intermediate position, the second double-contrate-tooth combined fluted disc 350 neither engages with the right contrate teeth of the third external-gear right-contrate-tooth combined gear 340, nor engages with the left contrate teeth of the second external-gear left-contrate-tooth combined gear 360.

Optionally, the automatic transmission further comprises N first gear trains, to realize a 2+(N*2) speed automatic transmission;

or, the automatic transmission further comprises N−1 first gear trains and one second gear train, to realize a 2+((N−1)*2)+1 speed automatic transmission;

wherein N is a positive integer greater than or equal to 1;

each of the first gear trains comprises: an external-gear right-contrate-tooth combined gear, an external-gear left-contrate-tooth combined gear, a gear one, a gear two and a double-contrate-tooth combined fluted disc; wherein, the external-gear right-contrate-tooth combined gear has peripheral teeth and right contrate teeth, and the external-gear right-contrate-tooth combined gear is loosely nested on the transmission output shaft 150; the external-gear right-contrate-tooth combined gear and the gear one engage by peripheral teeth; the gear one is fixedly connected to the transmission intermediate shaft 140; the external-gear left-contrate-tooth combined gear has peripheral teeth and left contrate teeth, and the external-gear left-contrate-tooth combined gear is loosely nested on the transmission output shaft 150; the external-gear left-contrate-tooth combined gear and the gear two engage by peripheral teeth; the gear two is fixedly connected to the transmission intermediate shaft 140; the double-contrate-tooth combined fluted disc comprises left contrate teeth and right contrate teeth; and the double-contrate-tooth combined fluted disc is installed on the transmission output shaft 150, is able to turn synchronously with the transmission output shaft 150, and is able to axially move along the transmission output shaft 150; and the second gear train comprises: an external-gear right-contrate-tooth combined gear, a gear three and a contrate-tooth combined fluted disc; wherein, the external-gear right-contrate-tooth combined gear has peripheral teeth and right contrate teeth, and the external-gear right-contrate-tooth combined gear is loosely nested on the transmission output shaft 150; the external-gear right-contrate-tooth combined gear and the gear three engage by peripheral teeth; the gear three is fixedly connected to the transmission intermediate shaft 140; the contrate-tooth combined fluted disc comprises left contrate teeth; the contrate-tooth combined fluted disc is installed on the transmission output shaft 150, is able to turn synchronously with the transmission output shaft 150, and is able to axially move along the transmission output shaft 150.

Optionally, the first double-contrate-tooth combined fluted disc 120 consists of a left-contrate-tooth combined fluted disc and a right-contrate-tooth combined fluted disc;

wherein, the left-contrate-tooth combined fluted disc and the right-contrate-tooth combined fluted disc are individually independent structures; or, the left-contrate-tooth combined fluted disc and the right-contrate-tooth combined fluted disc are integrally assembled structures.

The present invention further provides an automatic transmission, wherein the automatic transmission comprises: a first left-contrate-tooth combined fluted disc 920, a first right-contrate-tooth combined fluted disc 960 and a two stage transmission ordinary gear train.

Optionally, the two stage transmission ordinary gear train comprises: a transmission input shaft 900, a transmission intermediate shaft 940, a transmission output shaft 950, a first external-gear right-contrate-tooth combined gear 910, a first external-gear left-contrate-tooth combined gear 931, a first gear 911 and a second gear 930;

wherein, the transmission input shaft 900, the transmission intermediate shaft 940 and the transmission output shaft 950 are paralleled arranged; the first external-gear right-contrate-tooth combined gear 910 is fixedly connected to the transmission input shaft 900 by a key, the first external-gear right-contrate-tooth combined gear 910 and the first gear 911 engage by peripheral teeth, and the first gear 911 is fixedly connected to the transmission intermediate shaft 940 by a key; the second gear 930 is fixedly connected to the transmission output shaft 950 by a key, the second gear 930 and the first external-gear left-contrate-tooth combined gear 931 engage by peripheral teeth, and the first external-gear left-contrate-tooth combined gear 931 is loosely nested on the transmission intermediate shaft 940.

Optionally, the first left-contrate-tooth combined fluted disc 920 is able to turn synchronously with the transmission output shaft 950, and is able to axially move along the transmission output shaft 950; the first right-contrate-tooth combined fluted disc 960 is able to turn synchronously with the transmission intermediate shaft 940, and is able to axially move along the transmission intermediate shaft 940;

the first external-gear right-contrate-tooth combined gear 910 further has right contrate teeth; after the first left-contrate-tooth combined fluted disc 920 moves to the left to a specified position, the right contrate teeth of the first external-gear right-contrate-tooth combined gear 910 and the left contrate teeth of the first left-contrate-tooth combined fluted disc 920 engage;

the first external-gear left-contrate-tooth combined gear 931 further has left contrate teeth; after the first right-contrate-tooth combined fluted disc 960 moves to the right to a specified position, the left contrate teeth of the first external-gear left-contrate-tooth combined gear 931 and the right contrate teeth of the first right-contrate-tooth combined fluted disc 960 engage; and when the first left-contrate-tooth combined fluted disc 920 and the first right-contrate-tooth combined fluted disc 960 are in an intermediate position, the first left-contrate-tooth combined fluted disc 920 does not engage with the right contrate teeth of the first external-gear right-contrate-tooth combined gear 910, and the first right-contrate-tooth combined fluted disc 960 does not engage with the left contrate teeth of the first external-gear left-contrate-tooth combined gear 931.

Optionally, the automatic transmission further comprises a gear-shift controlling mechanism;

the gear-shift controlling mechanism is a built-in electromagnetic actuating mechanism; or, the gear-shift controlling mechanism is an outboard hydraulic, pneumatic or electrical actuating mechanism; and when the gear-shift controlling mechanism is a built-in electromagnetic actuating mechanism, the gear-shift controlling mechanism specially comprises a first left end electromagnet that is installed on the first left-contrate-tooth combined fluted disc 920 and a first right end electromagnet that is installed on the first right-contrate-tooth combined fluted disc 960; when the first left end electromagnet is electrified, the first left-contrate-tooth combined fluted disc 920 moves to the left to a specified position; when the first right end electromagnet is electrified, the first right-contrate-tooth combined fluted disc 960 moves to the right to a specified position.

Optionally, the intertooth spaces and tooth slots of the left contrate teeth of the first left-contrate-tooth combined fluted disc 920, the right contrate teeth of the first right-contrate-tooth combined fluted disc 960 and the first external-gear right-contrate-tooth combined gear 910 and the left contrate teeth of the first external-gear left-contrate-tooth combined gear 931 are all rectangular.

Optionally, the automatic transmission further comprises: a second left-contrate-tooth combined fluted disc 1010, a second external-gear right-contrate-tooth combined gear 1000 and a third gear 1011;

wherein, the second external-gear right-contrate-tooth combined gear 1000 has peripheral teeth and right contrate teeth, the second external-gear right-contrate-tooth combined gear 1000 is loosely nested on the transmission output shaft 950; the second external-gear right-contrate-tooth combined gear 1000 and the third gear 1011 engage by peripheral teeth; the third gear 1011 is fixedly connected to the transmission intermediate shaft 940 by a key;

the second left-contrate-tooth combined fluted disc 1010 comprises left contrate teeth; the second left-contrate-tooth combined fluted disc 1010 is installed on the transmission output shaft 950 by a key, and the second left-contrate-tooth combined fluted disc 1010 is able to turn synchronously with the transmission output shaft 950, and is able to axially move along the transmission output shaft 950;

after the second left-contrate-tooth combined fluted disc 1010 moves to the left to a specified position, the right contrate teeth of the second external-gear right-contrate-tooth combined gear 1000 and the left contrate teeth of the second left-contrate-tooth combined fluted disc 1010 engage; and when the second left-contrate-tooth combined fluted disc 1010 is in an intermediate position, the second left-contrate-tooth combined fluted disc 1010 does not engage with the right contrate teeth of the second external-gear right-contrate-tooth combined gear 1000.

Optionally, the automatic transmission further comprises: a third left-contrate-tooth combined fluted disc 1110, a second right-contrate-tooth combined fluted disc 1140, a third external-gear right-contrate-tooth combined gear 1100, a fourth gear 1101, a second external-gear left-contrate-tooth combined gear 1130 and a fifth gear 1120;

wherein, the third external-gear right-contrate-tooth combined gear 1100 has peripheral teeth and right contrate teeth, and the third external-gear right-contrate-tooth combined gear 1100 is loosely nested on the transmission output shaft 950; the third external-gear right-contrate-tooth combined gear 1100 and the fourth gear 1101 engage by peripheral teeth; and the fourth gear 1101 is fixedly connected to the transmission intermediate shaft 940 by a key;

the second external-gear left-contrate-tooth combined gear 1130 has peripheral teeth and left contrate teeth, and the second external-gear left-contrate-tooth combined gear 1130 is loosely nested on the transmission intermediate shaft 940; the second external-gear left-contrate-tooth combined gear 1130 and the fifth gear 1120 engage by peripheral teeth; the fifth gear 1120 is fixedly connected to the transmission output shaft 950 by a key;

the third left-contrate-tooth combined fluted disc 1110 comprises left contrate teeth; the third left-contrate-tooth combined fluted disc 1110 is installed on the transmission output shaft 950 by a key, and the third left-contrate-tooth combined fluted disc 1110 is able to turn synchronously with the transmission output shaft 950, and is able to axially move along the transmission output shaft 950;

after the third left-contrate-tooth combined fluted disc 1110 moves to the left to a specified position, the right contrate teeth of the third external-gear right-contrate-tooth combined gear 1100 and the left contrate teeth of the third left-contrate-tooth combined fluted disc 1110 engage;

the second right-contrate-tooth combined fluted disc 1140 comprises right contrate teeth; the second right-contrate-tooth combined fluted disc 1140 is installed on the transmission intermediate shaft 940 by a key, and the second right-contrate-tooth combined fluted disc 1140 is able to turn synchronously with the transmission intermediate shaft 940, and is able to axially move along the transmission intermediate shaft 940;

after the second right-contrate-tooth combined fluted disc 1140 moves to the right to a specified position, the left contrate teeth of the second external-gear left-contrate-tooth combined gear 1130 and the right contrate teeth of the second right-contrate-tooth combined fluted disc 1140 engage; and when the third left-contrate-tooth combined fluted disc 1110 and the second right-contrate-tooth combined fluted disc 1140 are in an intermediate position, the third left-contrate-tooth combined fluted disc 1110 does not engage with the right contrate teeth of the third external-gear right-contrate-tooth combined gear 1100, and the second right-contrate-tooth combined fluted disc 1140 does not engage with the left contrate teeth of the second external-gear left-contrate-tooth combined gear 1130.

Optionally, the automatic transmission further comprises N first gear trains, to realize a 2+N*2 speed automatic transmission;

or, the automatic transmission further comprises N−1 first gear trains and one second gear train, to realize a 2+(N−1)*2+1 speed automatic transmission;

wherein N is a positive integer greater than or equal to 1;

each of the first gear trains comprises: an external-gear right-contrate-tooth combined gear, an external-gear left-contrate-tooth combined gear, a gear one, a gear two, a left-contrate-tooth combined fluted disc and a right-contrate-tooth combined fluted disc; wherein, the external-gear right-contrate-tooth combined gear has peripheral teeth and right contrate teeth, and the external-gear right-contrate-tooth combined gear is loosely nested on the transmission output shaft 950; the external-gear right-contrate-tooth combined gear and the gear one engage by peripheral teeth; the gear one is fixedly connected to the transmission intermediate shaft 940; the external-gear left-contrate-tooth combined gear has peripheral teeth and left contrate teeth, and the external-gear left-contrate-tooth combined gear is loosely nested on the transmission output shaft 950; the external-gear left-contrate-tooth combined gear and the gear two engage by peripheral teeth; the gear two is fixedly connected to the transmission intermediate shaft 940; the left-contrate-tooth combined fluted disc is installed on the transmission output shaft 950, is able to turn synchronously with the transmission output shaft 950, and is able to axially move along the transmission output shaft 950; the right-contrate-tooth combined fluted disc is installed on the transmission intermediate shaft 940, is able to turn synchronously with the transmission intermediate shaft 940, and is able to axially move along the transmission intermediate shaft 940; and the second gear train comprises: an external-gear right-contrate-tooth combined gear, a gear three and a contrate-tooth combined fluted disc; wherein, the external-gear right-contrate-tooth combined gear has peripheral teeth and right contrate teeth, and the external-gear right-contrate-tooth combined gear is loosely nested on the transmission output shaft 950; the external-gear right-contrate-tooth combined gear and the gear three engage by peripheral teeth; the gear three is fixedly connected to the transmission intermediate shaft 940; the contrate-tooth combined fluted disc comprises left contrate teeth; the contrate-tooth combined fluted disc is installed on the transmission output shaft 950, is able to turn synchronously with the transmission output shaft 950, and is able to axially move along the transmission output shaft 950.

It can be known from above that, the present invention has the following advantageous effects:

1. Compared with the traditional AMT, in the present invention, by employing the double-contrate-tooth combined fluted disc as the gear shifting element, a synchronizer is not needed. Therefore, the structure is simple, the reliability is increased, the gear shift duration is shortened, the shifting shock is relatively small, the manufacturing cost is low, and it is easy to realize industrialization.
2. The transmission of the present invention has simple arrangement of gears, short axial dimension, small weight, and compact structure. Thus, gear shifting is quick, and the reliability is high.
3. The automatic transmission of the present invention can be conveniently expanded to three-speed, four-speed, five-speed, six-speed transmissions and so on.

DESCRIPTION OF THE EMBODIMENTS

The embodiments of the present invention provide an automatic transmission that comprises a double-contrate-tooth combined fluted disc and a two stage transmission ordinary gear train. gear shifting mechanism of the transmission is a double-contrate-tooth combined fluted disc, which has double contrate teeth, namely, left contrate teeth and right contrate teeth. By the axial moving of the double-contrate-tooth combined fluted disc on the transmission output shaft, its left contrate teeth and right contrate teeth respectively engage with the contrate teeth of the first gear and the second gear reduction gears, to realize the second shift position and the first shift position, and when it engages with neither of them, the transmission is in the neutral shift position. The present invention further provides an automatic transmission that comprises a left-contrate-tooth combined fluted disc, a right-contrate-tooth combined fluted disc and a two stage transmission ordinary gear train, wherein gear shifting mechanism of the transmission is the leftcontrate-tooth combined fluted disc or the right-contrate-tooth combined fluted disc. Compared with the traditional AMT, in the technical solution of the present invention, the transmission mechanism engages directly by teeth, so a synchronizer is not needed. Therefore, the structure is simple, the reliability is increased, the gear shift duration is shortened, the shifting shock is relatively small, the manufacturing cost is low, and it is easy to realize industrialization. The transmission has simple arrangement of gears, short axial dimension, small weight, and compact structure and meets the development trend of light weighting and fuel saving. The transmission can be conveniently expanded to three-speed, four-speed, five-speed, six-speed transmissions and so on.

In order to make the objects, technical solutions and advantages of the present invention clearer, the embodiments of the present invention will be described below in further detail in conjunction with the drawings.

First Embodiment

Figure 1:
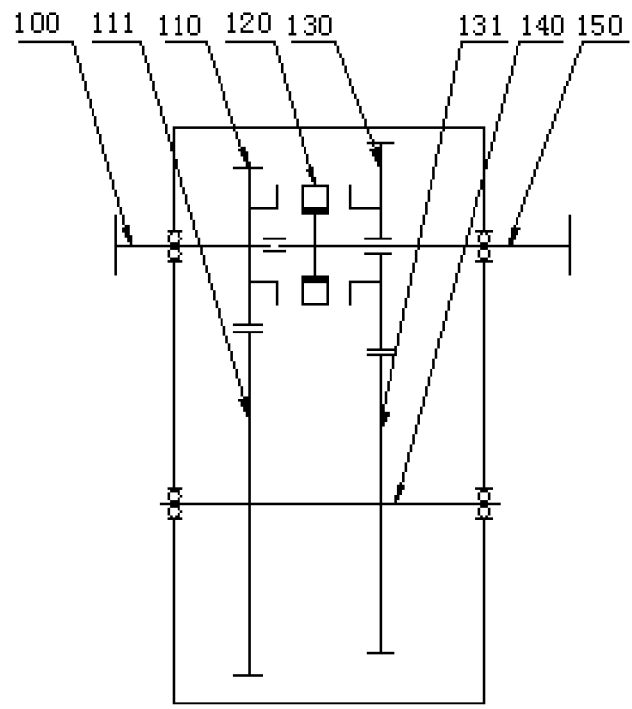
FIG. 1 is a schematic diagram of the structure of the two-speed automatic transmission of the first embodiment of the present invention.
Figure 2:
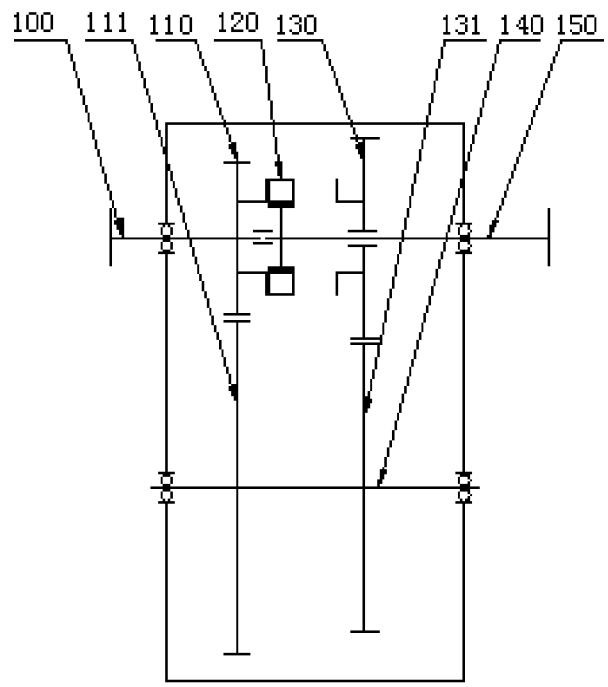
FIG. 2 is a schematic diagram of the transmission of the second shift position of the two-speed automatic transmission of the first embodiment of the present invention.
Figure 3:
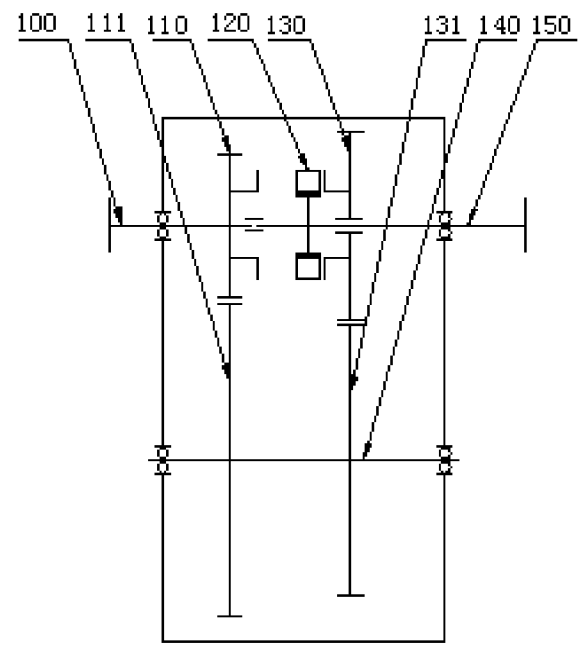
FIG. 3 is a schematic diagram of the transmission of the first shift position of the two-speed automatic transmission of the first embodiment of the present invention.

FIG. 1 is a schematic diagram of the structure of the two-speed automatic transmission of the first embodiment of the present invention. FIG. 2 is a schematic diagram of the transmission of the second shift position of the two-speed automatic transmission of the first embodiment of the present invention. FIG. 3 is a schematic diagram of the transmission of the first shift position of the two-speed automatic transmission of the first embodiment of the present invention.

Referring to FIG. 1, the automatic transmission of the first embodiment comprises a first double-contrate-tooth combined fluted disc 120 and a two stage transmission ordinary gear train. The two stage transmission ordinary gear train comprises: a transmission input shaft 100, a transmission intermediate shaft 140, a transmission output shaft 150, a first external-gear right-contrate-tooth combined gear 110, a first external-gear left-contrate-tooth combined gear 130, a first gear 111 and a second gear 131.

The transmission input shaft 100, the transmission intermediate shaft 140 and transmission output shaft 150 are paralleled arranged; the first external-gear right-contrate-tooth combined gear 110 is fixedly connected to the transmission input shaft 100 by a key, the first external-gear right-contrate-tooth combined gear 110 and the first gear 111 engage by peripheral teeth, and the first gear 111 and the second gear 131 are individually fixedly connected to the transmission intermediate shaft 140 by a key; the second gear 131 and the first external-gear left-contrate-tooth combined gear 130 engage by peripheral teeth, and the first external-gear left-contrate-tooth combined gear 130 is loosely nested on the transmission output shaft 150; the first double-contrate-tooth combined fluted disc 120 is installed on the transmission output shaft 150 by a key.

The first double-contrate-tooth combined fluted disc 120 comprises left contrate teeth and right contrate teeth; the first double-contrate-tooth combined fluted disc 120 is able to turn synchronously with the transmission output shaft 150, and is able to axially move along the transmission output shaft 150. The first external-gear right-contrate-tooth combined gear 110 further has right contrate teeth; after the first double-contrate-tooth combined fluted disc 120 moves to the left to a specified position, the right contrate teeth of the first external-gear right-contrate-tooth combined gear 110 and the left contrate teeth of the first double-contrate-tooth combined fluted disc 120 engage. The first external-gear left-contrate-tooth combined gear 130 further has left contrate teeth; after the first double-contrate-tooth combined fluted disc 120 moves to the right to a specified position, the left contrate teeth of the first external-gear left-contrate-tooth combined gear 130 and the right contrate teeth of the first double-contrate-tooth combined fluted disc 120 engage. When the first double-contrate-tooth combined fluted disc 120 is in an intermediate position, the first double-contrate-tooth combined fluted disc 120 neither engages with the right contrate teeth of the first external-gear right-contrate-tooth combined gear 110, nor engages with the left contrate teeth of the first external-gear left-contrate-tooth combined gear 130.

In the embodiment of the present invention, the automatic transmission further comprises a gear-shift controlling mechanism. The gear-shift controlling mechanism may be a built-in electromagnetic actuating mechanism; the gear-shift controlling mechanism may also be an outboard hydraulic, pneumatic or electrical actuating mechanism.

In the first embodiment, a built-in electromagnetic mechanism serves as the gear-shift controlling mechanism for driving the first double-contrate-tooth combined fluted disc 120 to axially move along the transmission output shaft 150. Specifically, the gear-shift controlling mechanism comprises a first left end electromagnet and a first right end electromagnet that are installed on the first double-contrate-tooth combined fluted disc 120.

Referring to FIG. 2, when the first left end electromagnet is electrified, after the first double-contrate-tooth combined fluted disc 120 moves to the left to a specified position, the right contrate teeth of the first external-gear right-contrate-tooth combined gear 110 and the left contrate teeth of the first double-contrate-tooth combined fluted disc 120 engage. The first external-gear right-contrate-tooth combined gear 110 turns and drives the first double-contrate-tooth combined fluted disc 120 to turn, thereby the input rotation speed and power of the transmission are directly transmitted to the transmission output shaft 150 via the transmission input shaft 100. The transmission ratio is 1, which is the direct shift position, and is the second shift position in the first embodiment.

Referring to FIG. 3, when the first right end electromagnet is electrified, after the first double-contrate-tooth combined fluted disc 120 moves to the right to a specified position, the left contrate teeth of the first external-gear left-contrate-tooth combined gear 130 and the right contrate teeth of the first double-contrate-tooth combined fluted disc 120 engage. The transmission input shaft 100 turns and drives the first external-gear right-contrate-tooth combined gear 110 to turn, then drives the first gear 111 to turn, then drives the intermediate shaft 140 to turn, and further drives the second gear 131 that is fixedly connected to the transmission intermediate shaft 140 by a key, and in turn drives the first external-gear left-contrate-tooth combined gear 130 to turn. Because the left contrate teeth of the first external-gear left-contrate-tooth combined gear 130 and the right contrate teeth of the first double-contrate-tooth combined fluted disc 120 engage, the first double-contrate-tooth combined fluted disc 120 and the first transmission output shaft 150 are finally driven to turn. In this way, the input rotation speed and power of the transmission are transmitted to the transmission output shaft 150 via the input shaft 100, the first external-gear right-contrate-tooth combined gear 110, the first gear 111, the transmission intermediate shaft 140, the second gear 131, the first external-gear left-contrate-tooth combined gear 130 and the first double-contrate-tooth combined fluted disc 120 of the transmission. In the present embodiment, the transmission ratio is 2.5, and the first shift position is realized, so that the vehicle can adapt to operating modes such as starting up and climbing up a slope.

It should be noted that, in each embodiment of the present invention, the transmission ratios and shift positions can be changed by changing the sizes and tooth numbers of gears, to adapt to different practical situations and demands.

As shown in FIG. 1, when the first double-contrate-tooth combined fluted disc 120 is in an intermediate position, and neither engages with the right contrate teeth of the first external-gear right-contrate-tooth combined gear 110, nor engages with the left contrate teeth of the first external-gear left-contrate-tooth combined gear 130, the transmission is in the neutral shift position.

Second Embodiment

The specific structure of the double-contrate-tooth combined fluted disc of the present invention can be conveniently expanded to three-speed, four-speed, five-speed, six-speed transmissions and so on. The second embodiment provides a structure in which a two-speed automatic transmission is expanded to a three-speed automatic transmission.

Figure 4:
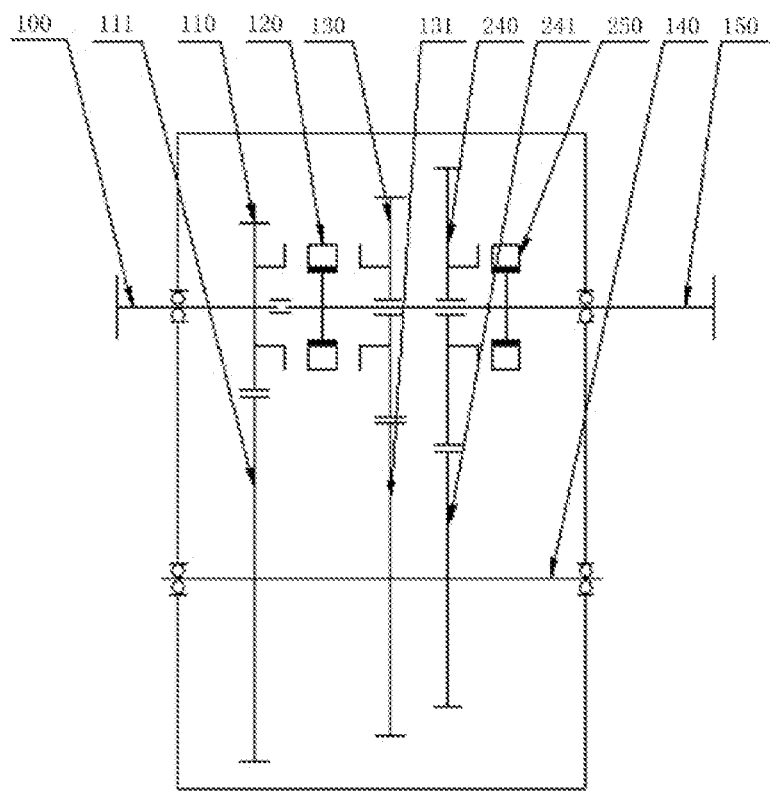
FIG. 4 is a schematic diagram of the structure of the three-speed automatic transmission of the second embodiment of the present invention.

FIG. 4 is a schematic diagram of the structure of the three-speed automatic transmission of the second embodiment of the present invention. As shown in FIG. 4, the three-speed automatic transmission is realized by adding a contrate-tooth combined fluted disc 250, a second external-gear right-contrate-tooth combined gear 240 and a third gear 241 on the basis of the two-speed automatic transmission of the first embodiment. Namely, besides the transmission input shaft 100, the transmission intermediate shaft 140, the transmission output shaft 150, the first external-gear right-contrate-tooth combined gear 110, the first external-gear left-contrate-tooth combined gear 130, the first gear 111 and the second gear 131, the three-speed automatic transmission of the second embodiment further comprises: a contrate-tooth combined fluted disc 250, a second external-gear right-contrate-tooth combined gear 240 and a third gear 241.

The second external-gear right-contrate-tooth combined gear 240 has peripheral teeth and right contrate teeth, and the second external-gear right-contrate-tooth combined gear 240 is loosely nested on the transmission output shaft 150; the second external-gear right-contrate-tooth combined gear 240 and the third gear 241 engage by peripheral teeth; the third gear 241 is fixedly connected to the transmission intermediate shaft 140 by a key.

The contrate-tooth combined fluted disc 250 comprises left contrate teeth; the contrate-tooth combined fluted disc 250 is installed on the transmission output shaft 150 by a key, and the contrate-tooth combined fluted disc 250 is able to turn synchronously with the transmission output shaft 150, and is able to axially move along the transmission output shaft 150.

The contrate-tooth combined fluted disc 250 further comprises a third left end electromagnet.

When the first double-contrate-tooth combined fluted disc 120 is not electrified, and the third left end electromagnet of the contrate-tooth combined fluted disc 250 is electrified, after the contrate-tooth combined fluted disc 250 moves to the left to a specified position, the right contrate teeth of the second external-gear right-contrate-tooth combined gear 240 and the left contrate teeth of the contrate-tooth combined fluted disc 250 engage.

At this point of time, the transmission input shaft 100 turns and drives the first external-gear right-contrate-tooth combined gear 110 to turn, then drives the first gear 111 to turn, and then drives the transmission intermediate shaft 140 to turn, and further drives the third gear 241 that is fixedly connected to the transmission intermediate shaft 140 by a key to turn, and in turn drives the second external-gear right-contrate-tooth combined gear 240 to turn. Because the right contrate teeth of the second external-gear left-contrate-tooth combined gear 240 and the left contrate teeth of the contrate-tooth combined fluted disc 250 engage, the contrate-tooth combined fluted disc 250 and the transmission output shaft 150 are finally driven to turn. In this way, the input rotation speed and power of the transmission are transmitted to the transmission output shaft 150 via the input shaft 100, the external-gear right-contrate-tooth combined gear 110, the first gear 111, the transmission intermediate shaft 140, the third gear 241, the second external-gear right-contrate-tooth combined gear 240 and the contrate-tooth combined fluted disc 250 of the transmission. At this point of time, one shift position of the three-speed transmission is realized, which in the present particular embodiment is the first shift position.

When the third left end electromagnet of the contrate-tooth combined fluted disc 250 is not electrified, the contrate-tooth combined fluted disc 250 is in an intermediate position, and does not engage with the right contrate teeth of the second external-gear right-contrate-tooth combined gear 240.

When the third left end electromagnet of the contrate-tooth combined fluted disc 250 is not electrified, and the left end electromagnet of the first double-contrate-tooth combined fluted disc 120 is electrified, like in the first embodiment, the input rotation speed and power of the transmission are transmitted to the transmission output shaft 150 directly via the transmission input shaft 100. At this point of time, another shift position of the three-speed transmission is realized, which in the present particular embodiment is the third shift position, and is also the direct shift position.

When the third left end electromagnet of the contrate-tooth combined fluted disc 250 is not electrified, and the first right end electromagnet of the first double-contrate-tooth combined fluted disc 120 is electrified, like in the first embodiment, the input rotation speed and power of the transmission are transmitted to the transmission output shaft 150 via the input shaft 100, the external-gear right-contrate-tooth combined gear 110, the first gear 111, the transmission intermediate shaft 140, the second gear 131, the external-gear left-contrate-tooth combined gear 130 and the double-contrate-tooth combined fluted disc 120 of the transmission. At this point of time, another shift position of the three-speed transmission is realized, which in the present particular embodiment is the second shift position.

When none of the third left end electromagnet of the contrate-tooth combined fluted disc 250, and the first left end electromagnet and the first right end electromagnet of the first double-contrate-tooth combined fluted disc 120 is electrified, both of the contrate-tooth combined fluted disc 250 and the first double-contrate-tooth combined fluted disc 120 are in an intermediate position, the first double-contrate-tooth combined fluted disc 120 neither engages with the right contrate teeth of the first external-gear right-contrate-tooth combined gear 110, nor engages with the left contrate teeth of the first external-gear left-contrate-tooth combined gear 130, and the contrate-tooth combined fluted disc 250 does not engage with the right contrate teeth of the second external-gear right-contrate-tooth combined gear 240. At this point of time the transmission is in the neutral shift position.

The transmission ratio of each shift position can be changed by changing the sizes and tooth numbers of gears, to adapt to different practical situations and demands.

In addition, it should be noted that, in order to achieve the object of the present embodiment, the contrate-tooth combined fluted disc 250 of the present embodiment comprises the left contrate teeth and the third left end electromagnet. In practice, the present invention may also use a double-contrate-tooth combined fluted disc, and in this case the contrate teeth and the electromagnet on the right are not in use.

Third Embodiment

The specific structure of the double-contrate-tooth combined fluted disc of the present invention can be conveniently expanded to three-speed, four-speed, five-speed, six-speed transmissions and so on. The present embodiment describes in detail how to expand from the two-speed automatic transmission to a four-speed automatic transmission.

Figure 5:
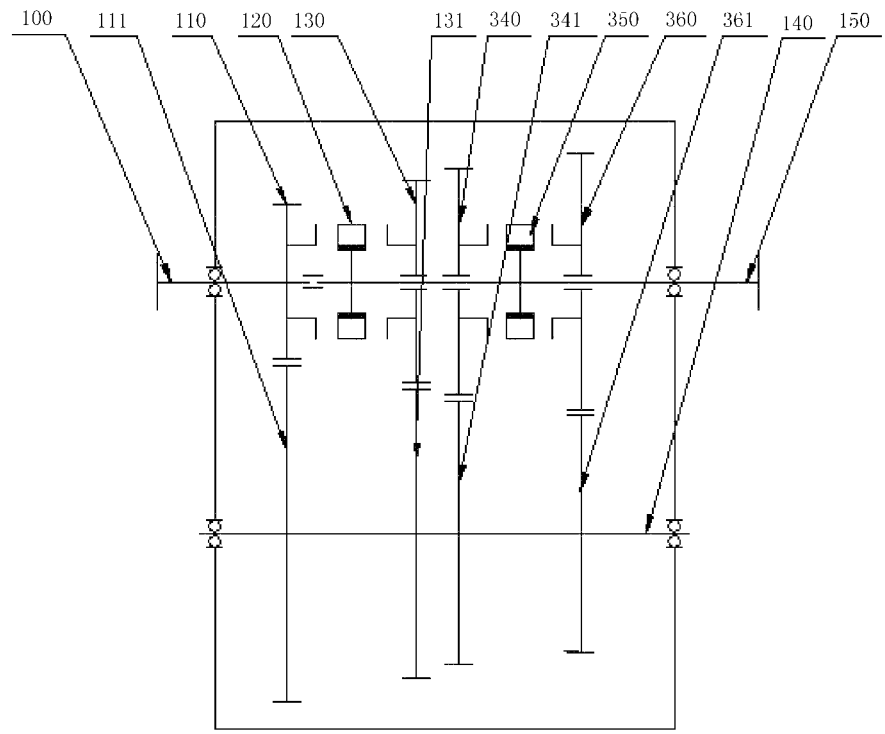
FIG. 5 is a schematic diagram of the structure of the four-speed automatic transmission of the third embodiment of the present invention.

FIG. 5 is a schematic diagram of the structure of the four-speed automatic transmission of the third embodiment of the present invention. As shown in FIG. 5, the four-speed automatic transmission is realized by adding a second double-contrate-tooth combined fluted disc 350 on the basis of the two-speed automatic transmission of the first embodiment.

As shown in FIG. 5, besides the transmission input shaft 100, the transmission intermediate shaft 140, the transmission output shaft 150, the first external-gear right-contrate-tooth combined gear 110, the first external-gear left-contrate-tooth combined gear 130, the first gear 111 and the second gear 131, further comprises: a second double-contrate-tooth combined fluted disc 350, a third external-gear right-contrate-tooth combined gear 340, a fourth gear 341, a second external-gear left-contrate-tooth combined gear 360 and a fifth gear 361.

The third external-gear right-contrate-tooth combined gear 340 has peripheral teeth and right contrate teeth, and the third external-gear right-contrate-tooth combined gear 340 is loosely nested on the transmission output shaft 150; the third external-gear right-contrate-tooth combined gear 340 and the fourth gear 341 engage by peripheral teeth; the fourth gear 341 is fixedly connected to the transmission intermediate shaft 140 by a key.

The second external-gear left-contrate-tooth combined gear 360 has peripheral teeth and left contrate teeth, and the second external-gear left-contrate-tooth combined gear 360 is loosely nested on the transmission output shaft 150; the second external-gear left-contrate-tooth combined gear 360 and the fifth gear 361 engage by peripheral teeth; and the fifth gear 361 is fixedly connected to the transmission intermediate shaft 140 by a key.

The second double-contrate-tooth combined fluted disc 350 comprises left contrate teeth and right contrate teeth; the second double-contrate-tooth combined fluted disc 350 is installed on the transmission output shaft 150 by a key, and the second double-contrate-tooth combined fluted disc 350 is able to turn synchronously with the transmission output shaft 150, and is able to axially move along the transmission output shaft 150.

The second double-contrate-tooth combined fluted disc 350 further comprises a second left end electromagnet and a second right end electromagnet.

When the second left end electromagnet of the second double-contrate-tooth combined fluted disc 350 is electrified, and the first double-contrate-tooth combined fluted disc 120 is not electrified, the double-contrate-tooth combined fluted disc 120 is in an intermediate position, and after the second double-contrate-tooth combined fluted disc 350 moves to the left to a specified position, the right contrate teeth of the third external-gear right-contrate-tooth combined gear 340 and the left contrate teeth of the second double-contrate-tooth combined fluted disc 350 engage.

At this point of time, the transmission input shaft 100 turns and drives the first external-gear right-contrate-tooth combined gear 110 to turn, then drives the first gear 111 to turn, and then drives the intermediate shaft 140 to turn, and further drives the fourth gear 341 that is fixedly connected to the transmission intermediate shaft 140 by a key, and in turn drives the third external-gear right-contrate-tooth combined gear 340 to turn. Because the right contrate teeth of the third external-gear left-contrate-tooth combined gear 340 and the left contrate teeth of the second double-contrate-tooth combined fluted disc 350 engage, the second double-contrate-tooth combined fluted disc 350 and the transmission output shaft 150 are finally driven to turn. In this way, the input rotation speed and power of the transmission are transmitted to the transmission output shaft 150 via the input shaft 100, the first external-gear right-contrate-tooth combined gear 110, the first gear 111, the transmission intermediate shaft 140, the fourth gear 241, the third external-gear right-contrate-tooth combined gear 340 and the second double-contrate-tooth combined fluted disc 350 of the transmission. At this point of time, one shift position of the four-speed transmission is realized.

Similarly, when the second right end electromagnet of the second double-contrate-tooth combined fluted disc 350 is electrified, and the first double-contrate-tooth combined fluted disc 120 is not electrified, the first double-contrate-tooth combined fluted disc 120 is in an intermediate position; after the second double-contrate-tooth combined fluted disc 350 moves to the right to a specified position, the left contrate teeth of the second external-gear right-contrate-tooth combined gear 360 and the right contrate teeth of the second double-contrate-tooth combined fluted disc 350 engage. At this point of time, the input rotation speed and power of the transmission are transmitted to the transmission output shaft 150 via the input shaft 100, the first external-gear right-contrate-tooth combined gear 110, the first gear 111, the transmission intermediate shaft 140, the fifth gear 361, the second external-gear right-contrate-tooth combined gear 360 and the second double-contrate-tooth combined fluted disc 350 of the transmission. At this point of time, one shift position of the four-speed transmission is realized.

When the electromagnet of the second double-contrate-tooth combined fluted disc 350 is not electrified, and the first left end electromagnet of the first double-contrate-tooth combined fluted disc 120 is electrified, like in the first embodiment, the input rotation speed and power of the transmission are directly transmitted to the transmission output shaft 150 via the transmission input shaft 100. At this point of time, one shift position of the four-speed transmission is realized.

When the electromagnet of the second double-contrate-tooth combined fluted disc 350 is not electrified, and the first right end electromagnet of the first double-contrate-tooth combined fluted disc 120 is electrified, like in the first embodiment, the input rotation speed and power of the transmission are transmitted to the transmission output shaft 150 via the input shaft 100, the external-gear right-contrate-tooth combined gear 110, the first gear 111, the transmission intermediate shaft 140, the second gear 131, the first external-gear left-contrate-tooth combined gear 130 and the first double-contrate-tooth combined fluted disc 120 of the transmission. At this point of time, one shift position of the four-speed transmission is realized.

When both of the electromagnet of the second double-contrate-tooth combined fluted disc 350 and the electromagnet of the first double-contrate-tooth combined fluted disc 120 are not electrified, both of the second double-contrate-tooth combined fluted disc 350 and the first double-contrate-tooth combined fluted disc 120 are in the respective corresponding intermediate positions, the first double-contrate-tooth combined fluted disc 120 neither engages with the right contrate teeth of the first external-gear right-contrate-tooth combined gear 110, nor engages with the left contrate teeth of the first external-gear left-contrate-tooth combined gear 130, and the second double-contrate-tooth combined fluted disc 350 neither engages with the right contrate teeth of the third external-gear right-contrate-tooth combined gear 340, nor engages with the left contrate teeth of the second external-gear left-contrate-tooth combined gear 360. At this point of time the transmission is in the neutral shift position.

The transmission ratio of each shift position can be changed by changing the sizes and tooth numbers of gears, to adapt to different practical situations and demands.

According to the above embodiments, it can be deduced that, a five-speed automatic transmission can be realized by adding one external-gear right-contrate-tooth combined gear, one gear and one double-contrate-tooth combined fluted disc on the basis of the third embodiment; a six-speed automatic transmission can be realized by adding one external-gear right-contrate-tooth combined gear, one external-gear left-contrate-tooth combined gear, two gears and one double-contrate-tooth combined fluted disc on the basis of the third embodiment. The following technical solutions can be obtained by analogy:

When the automatic transmission shown in the first embodiment further comprises N first gear trains, a 2+(N*2) speed automatic transmission can be realized, wherein N is a positive integer greater than or equal to 1. For example, when N=1, the four-speed automatic transmission as shown in the third embodiment can be realized, and when N=2, a six-speed automatic transmission can be realized, and so on.

When the automatic transmission shown in the first embodiment further comprises N−1 first gear trains and one second gear train, a 2+((N−1)*2)+1 speed automatic transmission can be realized, wherein N is a positive integer greater than or equal to 1; each of the first gear trains comprises: an external-gear right-contrate-tooth combined gear, an external-gear left-contrate-tooth combined gear, a gear one, a gear two and a double-contrate-tooth combined fluted disc; the external-gear right-contrate-tooth combined gear has peripheral teeth and right contrate teeth, and the external-gear right-contrate-tooth combined gear is loosely nested on the transmission output shaft 150; the external-gear right-contrate-tooth combined gear and the gear one engage by peripheral teeth; the gear one is fixedly connected to the transmission intermediate shaft 140; the external-gear left-contrate-tooth combined gear has peripheral teeth and left contrate teeth, and the external-gear left-contrate-tooth combined gear is loosely nested on the transmission output shaft 150; the external-gear left-contrate-tooth combined gear and the gear two engage by peripheral teeth; the gear two is fixedly connected to the transmission intermediate shaft 140; the double-contrate-tooth combined fluted disc comprises left contrate teeth and right contrate teeth; the double-contrate-tooth combined fluted disc is installed on the transmission output shaft 150, is able to turn synchronously with the transmission output shaft 150, and is able to axially move along the transmission output shaft 150.

The second gear train comprises: an external-gear right-contrate-tooth combined gear, a gear three and a contrate-tooth combined fluted disc; the external-gear right-contrate-tooth combined gear has peripheral teeth and right contrate teeth, and the external-gear right-contrate-tooth combined gear is loosely nested on the transmission output shaft 150; the external-gear right-contrate-tooth combined gear and the gear three engage by peripheral teeth; the gear three is fixedly connected to the transmission intermediate shaft 140; the contrate-tooth combined fluted disc comprises left contrate teeth; the contrate-tooth combined fluted disc is installed on the transmission output shaft 150, is able to turn synchronously with the transmission output shaft 150, and is able to axially move along the transmission output shaft 150. For example, when N=1, the three-speed automatic transmission as shown in the second embodiment can be realized, and when N=2, a five-speed automatic transmission can be realized, and so on.

Fourth Embodiment

Figure 6:
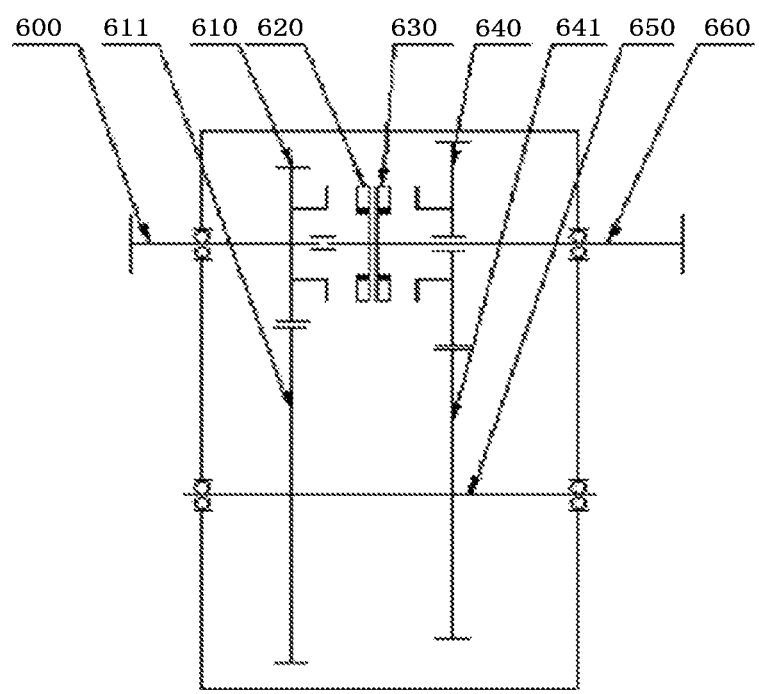
FIG. 6 is a schematic diagram of the structure of the two-speed automatic transmission of the fourth embodiment of the present invention.
Figure 7:
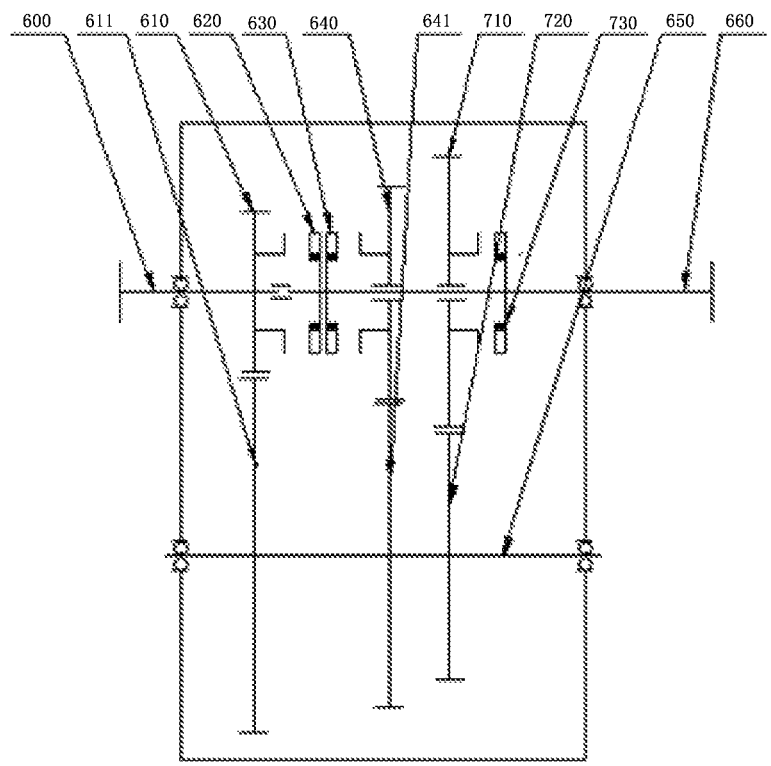
FIG. 7 is a schematic diagram of the structure of the three-speed automatic transmission of the fourth embodiment of the present invention.
Figure 8:
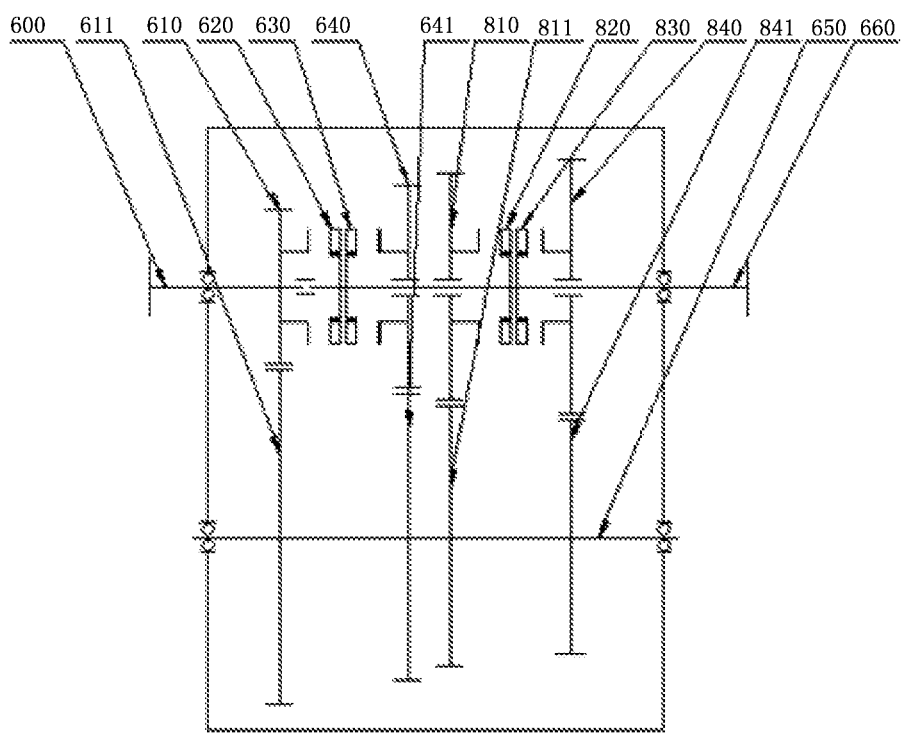
FIG. 8 is a schematic diagram of the structure of the four-speed automatic transmission of the fourth embodiment of the present invention.

FIG. 6, FIG. 7 and FIG. 8 are respectively schematic diagrams of the structure of the two-speed, three-speed and four-speed automatic transmissions of the fourth embodiment of the present invention.

Referring to FIG. 6, the left-contrate-tooth combined fluted disc 620 and the right-contrate-tooth combined fluted disc 630 are individually independent structures, while in the first embodiment the left-contrate-tooth combined fluted disc and the right-contrate-tooth combined fluted disc are integrally assembled, namely, they are assembled into the first double-contrate-tooth combined fluted disc 120 (see FIG. 1).

The operation details of the two-speed automatic transmission shown in FIG. 6 are similar to those of the first embodiment, and they differ in that, in the first embodiment, when the first left end electromagnet is electrified, the first double-contrate-tooth combined fluted disc 120 moves to the left to a specified position, and when the first right end electromagnet is electrified, the first double-contrate-tooth combined fluted disc 120 moves to the right to a specified position; however, in the fourth embodiment, when the left end electromagnet is electrified, the left-contrate-tooth combined fluted disc 620 moves to the left to a specified position, and the right-contrate-tooth combined fluted disc 630 is stationary; when the right end electromagnet is electrified, the right-contrate-tooth combined fluted disc 630 moves to the right to a specified position, and the left-contrate-tooth combined fluted disc 620 is stationary.

Similarly, the operation details of the three-speed and the four-speed automatic transmissions shown in FIG. 7 and FIG. 8 are correspondingly similar to those of the three-speed and four-speed automatic transmissions of the second and third embodiments respectively, and the difference is that the double-contrate-tooth combined fluted disc consists of the left-contrate-tooth combined fluted disc and the right-contrate-tooth combined fluted disc, which are structurally independent.

Fifth Embodiment

Figure 9:
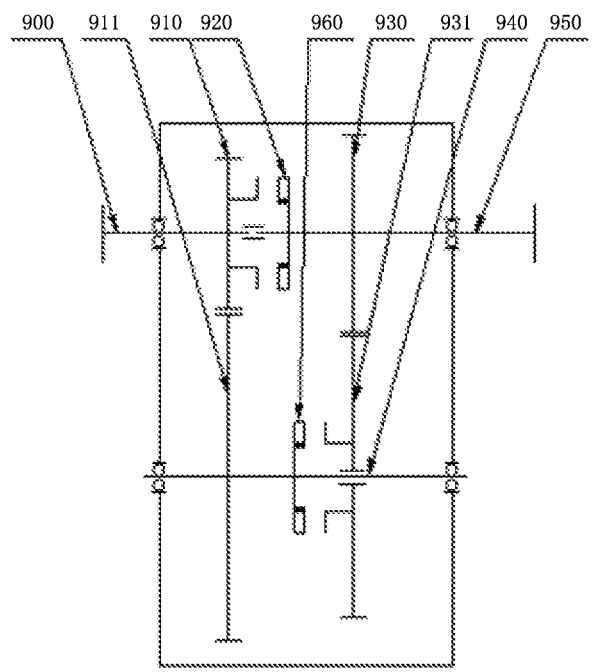
FIG. 9 is a schematic diagram of the structure of the two-speed automatic transmission of the fifth embodiment of the present invention.

FIG. 9 is a schematic diagram of the structure of the two-speed automatic transmission of the fifth embodiment of the present invention.

Referring to FIG. 9, the automatic transmission of the fifth embodiment comprises: a first left-contrate-tooth combined fluted disc 920, a first right-contrate-tooth combined fluted disc 960 and a two stage transmission ordinary gear train. The two stage transmission ordinary gear train comprises: a transmission input shaft 900, a transmission intermediate shaft 940, a transmission output shaft 950, a first external-gear right-contrate-tooth combined gear 910, a first external-gear left-contrate-tooth combined gear 931, a first gear 911 and a second gear 930.

The transmission input shaft 900, the transmission intermediate shaft 940 and the transmission output shaft 950 are paralleled arranged; the first external-gear right-contrate-tooth combined gear 910 is fixedly connected to the transmission input shaft 900 by a key, the first external-gear right-contrate-tooth combined gear 910 and the first gear 911 engage by peripheral teeth, and the first gear 911 is fixedly connected to the transmission intermediate shaft 940 by a key; the second gear 930 is fixedly connected to the transmission output shaft 950 by a key, the second gear 930 and the first external-gear left-contrate-tooth combined gear 931 engage by peripheral teeth, and the first external-gear left-contrate-tooth combined gear 931 is loosely nested on the transmission intermediate shaft 940.

Wherein, the first left-contrate-tooth combined fluted disc 920 is able to turn synchronously with the transmission output shaft 950, and is able to axially move along the transmission output shaft 950; the first right-contrate-tooth combined fluted disc 960 is able to turn synchronously with the transmission intermediate shaft 940, and is able to axially move along the transmission intermediate shaft 940.

The first external-gear right-contrate-tooth combined gear 910 further has right contrate teeth; after the first left-contrate-tooth combined fluted disc 920 moves to the left to a specified position, the right contrate teeth of the first external-gear right-contrate-tooth combined gear 910 and the left contrate teeth of the first left-contrate-tooth combined fluted disc 920 engage.

The first external-gear left-contrate-tooth combined gear 931 further has left contrate teeth; after the first right-contrate-tooth combined fluted disc 960 moves to the right to a specified position, the left contrate teeth of the first external-gear left-contrate-tooth combined gear 931 and the right contrate teeth of the first right-contrate-tooth combined fluted disc 960 engage.

When the first left-contrate-tooth combined fluted disc 920 and the first right-contrate-tooth combined fluted disc 960 are in an intermediate position, the first left-contrate-tooth combined fluted disc 920 does not engage with the right contrate teeth of the first external-gear right-contrate-tooth combined gear 910, and the first right-contrate-tooth combined fluted disc 960 does not engage with the left contrate teeth of the first external-gear left-contrate-tooth combined gear 931.

The automatic transmission further comprises a gear-shift controlling mechanism; the gear-shift controlling mechanism may be a built-in electromagnetic actuating mechanism; the gear-shift controlling mechanism may also be an outboard hydraulic, pneumatic or electrical actuating mechanism.

In the fifth embodiment a built-in electromagnetic mechanism serves as the gear-shift controlling mechanism for driving the first left-contrate-tooth combined fluted disc 920 to axially move along the transmission output shaft 950 and driving the first right-contrate-tooth combined fluted disc 960 to axially move along the transmission intermediate shaft 940. Specifically, the gear-shift controlling mechanism comprises a first left end electromagnet that is installed on the first left-contrate-tooth combined fluted disc 920 and a first right end electromagnet that is installed on the first right-contrate-tooth combined fluted disc 960.

When the first left end electromagnet is electrified, after the first left-contrate-tooth combined fluted disc 920 moves to the left to a specified position, the right contrate teeth of the first external-gear right-contrate-tooth combined gear 910 and the left contrate teeth of the first left-contrate-tooth combined fluted disc 920 engage. The transmission input shaft 900 turns and drives the first external-gear right-contrate-tooth combined gear 910 to turn, and in turn drives the first left-contrate-tooth combined fluted disc 920 to turn, thereby the input rotation speed and power of the transmission are directly transmitted to the transmission output shaft 950 via the transmission input shaft 900. At this point of time, one shift position of the two-speed transmission is realized.

When the first right end electromagnet is electrified, after the first right-contrate-tooth combined fluted disc 960 moves to the right to a specified position, the left contrate teeth of the first external-gear left-contrate-tooth combined gear 931 and the right contrate teeth of the first right-contrate-tooth combined fluted disc 960 engage. The transmission input shaft 900 turns and drives the first external-gear right-contrate-tooth combined gear 910 to turn, then drives the first gear 911 to turn, and then drives the intermediate shaft 940 to turn, and further drives the first right-contrate-tooth combined fluted disc 960 that is installed on the transmission intermediate shaft 940 by a key. Because the right contrate teeth of the first right-contrate-tooth combined fluted disc 960 and the left contrate teeth of the first external-gear left-contrate-tooth combined gear 931 engage, the first external-gear left-contrate-tooth combined gear 931 is driven to turn, and in turn the second gear 930 and the output shaft 950 are driven to turn. In this way, the input rotation speed and power of the transmission are finally transmitted to the transmission output shaft 950 via the input shaft 900, the first external-gear right-contrate-tooth combined gear 910, the first gear 911, the transmission intermediate shaft 940, the first right-contrate-tooth combined fluted disc 960, the first external-gear left-contrate-tooth combined gear 931 and the second gear 930 of the transmission. At this point of time, another shift position of the two-speed transmission is realized.

It should be noted that, in each embodiment of the present invention, the transmission ratio of each shift position can be changed by changing the sizes and tooth numbers of gears, to adapt to different practical situations and demands.

When the first left-contrate-tooth combined fluted disc 920 and the first right-contrate-tooth combined fluted disc 960 are in an intermediate position, and the first left-contrate-tooth combined fluted disc 920 does not engage with the right contrate teeth of the first external-gear right-contrate-tooth combined gear 910, and the first right-contrate-tooth combined fluted disc 960 does not engage with the left contrate teeth of the first external-gear left-contrate-tooth combined gear 931, the transmission is in the neutral shift position.

Sixth Embodiment

The left-contrate-tooth combined fluted disc and the right-contrate-tooth combined fluted disc of the present embodiment have mutually independent structures, thereby the automatic transmission of the present embodiment can be conveniently expanded to three-speed, four-speed, five-speed, six-speed transmissions and so on. The sixth embodiment provides a structure in which a two-speed automatic transmission is expanded to a three-speed automatic transmission.

Figure 10:
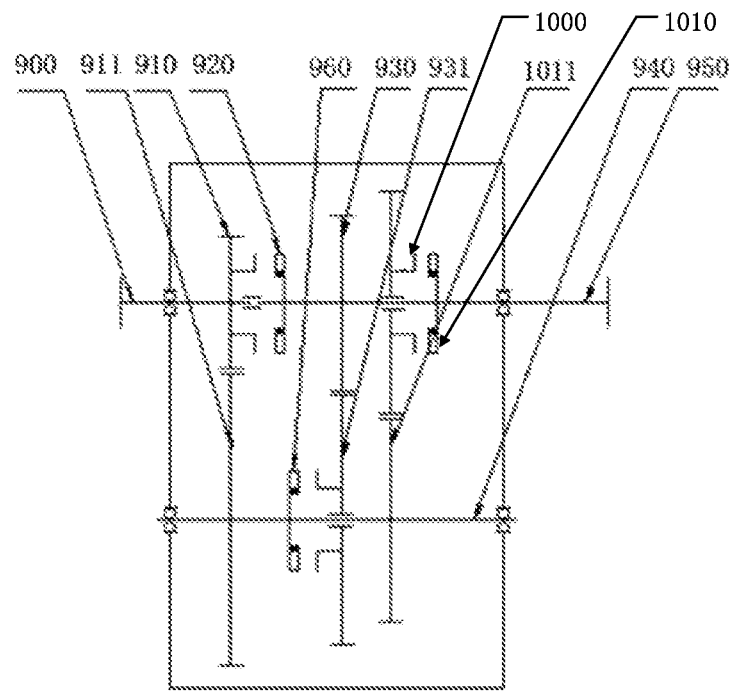
FIG. 10 is a schematic diagram of the structure of the three-speed automatic transmission of the sixth embodiment of the present invention.

FIG. 10 is a schematic diagram of the structure of the three-speed automatic transmission of the sixth embodiment of the present invention. As shown in FIG. 10, the three-speed automatic transmission is realized by adding a second external-gear right-contrate-tooth combined gear 1000, a third gear 1011 and a second left-contrate-tooth combined fluted disc 1010 on the basis of the two-speed automatic transmission of the fifth embodiment. Namely, besides the transmission input shaft 900, the first external-gear right-contrate-tooth combined gear 910, the first left-contrate-tooth combined fluted disc 920, the first right-contrate-tooth combined fluted disc 960, the transmission intermediate shaft 940, the transmission output shaft 950, the first external-gear left-contrate-tooth combined gear 931, the first gear 911 and the second gear 930, the three-speed automatic transmission of the sixth embodiment further comprises: a second left-contrate-tooth combined fluted disc 1010, a second external-gear right-contrate-tooth combined gear 1000 and a third gear 1011.

The second external-gear right-contrate-tooth combined gear 1000 has peripheral teeth and right contrate teeth, and the second external-gear right-contrate-tooth combined gear 1000 is loosely nested on the transmission output shaft 950; the second external-gear right-contrate-tooth combined gear 1000 and the third gear 1011 engage by peripheral teeth; and the third gear 1011 is fixedly connected to the transmission intermediate shaft 940 by a key.

The second left-contrate-tooth combined fluted disc 1010 comprises left contrate teeth; the second left-contrate-tooth combined fluted disc 1010 is installed on the transmission output shaft 950 by a key, and the second left-contrate-tooth combined fluted disc 1010 is able to turn synchronously with the transmission output shaft 950, and is able to axially move along the transmission output shaft 950.

The second left-contrate-tooth combined fluted disc 1010 further comprises a second left end electromagnet.

When the first left-contrate-tooth combined fluted disc 920 and the first right-contrate-tooth combined fluted disc 960 are not electrified, and the second left-contrate-tooth combined fluted disc 1010 is electrified, after the second left-contrate-tooth combined fluted disc 1010 moves to the left to a specified position, the right contrate teeth of the second external-gear right-contrate-tooth combined gear 1000 and the left contrate teeth of the second left-contrate-tooth combined fluted disc 1010 engage.

At this point of time, the transmission input shaft 900 turns and drives the first external-gear right-contrate-tooth combined gear 910 to turn, then drives the first gear 911 to turn, and then drives the transmission intermediate shaft 940 to turn, and further drives the third gear 1011 that is fixedly connected to the transmission intermediate shaft 940 by a key to turn, and then drives the second external-gear right-contrate-tooth combined gear 1000 to turn. Because the right contrate teeth of the second external-gear right-contrate-tooth combined gear 1000 and the left contrate teeth of the second left-contrate-tooth combined fluted disc 1010 engage, the second left-contrate-tooth combined fluted disc 1010 and the transmission output shaft 950 are finally driven to turn. In this way, the input rotation speed and power of the transmission are transmitted to the transmission output shaft 950 via the input shaft 900, the first external-gear right-contrate-tooth combined gear 910, the first gear 911, the third gear 1011, the second external-gear right-contrate-tooth combined gear 1000 and the second left-contrate-tooth combined fluted disc 1010 of the transmission. At this point of time, one shift position of the three-speed transmission is realized.

When the second left-contrate-tooth combined fluted disc 1010 is not electrified, and the first left-contrate-tooth combined fluted disc 920 is electrified, like in the fourth embodiment, the input rotation speed and power of the transmission are directly transmitted to the transmission output shaft 950 via the transmission input shaft 900. At this point of time, another shift position of the three-speed transmission is realized.

When the second left-contrate-tooth combined fluted disc 1010 is not electrified, and the first right-contrate-tooth combined fluted disc 960 is electrified, like in the fourth embodiment, the input rotation speed and power of the transmission are finally transmitted to the transmission output shaft 950 via the input shaft 900, the first external-gear right-contrate-tooth combined gear 910, the first gear 911, the transmission intermediate shaft 940, the first right-contrate-tooth combined fluted disc 960, the first external-gear left-contrate-tooth combined gear 931 and the second gear 930 of the transmission. At this point of time, still another shift position of the three-speed transmission is realized.

When none of the second left-contrate-tooth combined fluted disc 1010, the first left-contrate-tooth combined fluted disc 920 and the first right-contrate-tooth combined fluted disc 960 is electrified, all of the second left-contrate-tooth combined fluted disc 1010, the first left-contrate-tooth combined fluted disc 920 and the first right-contrate-tooth combined fluted disc 960 are in an intermediate position. At this point of time the transmission is in the neutral shift position.

When the second left-contrate-tooth combined fluted disc 1010 is in an intermediate position, it does not engage with the right contrate teeth of the second external-gear right-contrate-tooth combined gear 1000.

The transmission ratio of each shift position can be changed by changing the sizes and tooth numbers of gears, to adapt to different practical situations and demands.

Seventh Embodiment

The left-contrate-tooth combined fluted disc and the right-contrate-tooth combined fluted disc of the present invention are independent, thereby the automatic transmission of the present invention can be conveniently expanded to three-speed, four-speed, five-speed, six-speed transmissions and so on. The seventh embodiment provides a structure in which a two-speed automatic transmission is expanded to a four-speed automatic transmission.

Figure 11:
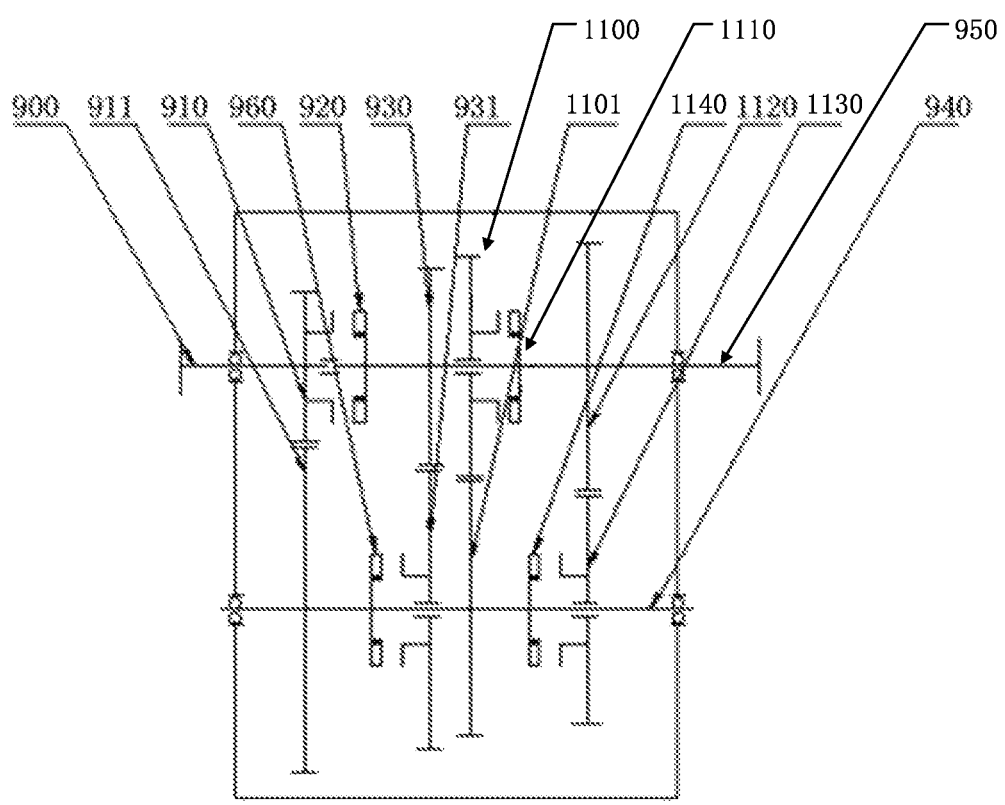
FIG. 11 is a schematic diagram of the structure of the four-speed automatic transmission of the seventh embodiment of the present invention.

FIG. 11 is a schematic diagram of the structure of the four-speed automatic transmission of the seventh embodiment of the present invention. As shown in FIG. 11, the four-speed automatic transmission is realized by adding a third left-contrate-tooth combined fluted disc 1110, a second right-contrate-tooth combined fluted disc 1140, a third external-gear right-contrate-tooth combined gear 1100, a fourth gear 1101, a second external-gear left-contrate-tooth combined gear 1130 and a fifth gear 1120 on the basis of the two-speed automatic transmission of the fifth embodiment.

As shown in FIG. 11, besides the transmission input shaft 900, the first external-gear right-contrate-tooth combined gear 910, the first left-contrate-tooth combined fluted disc 920, the first right-contrate-tooth combined fluted disc 960, the transmission intermediate shaft 940, the transmission output shaft 950, the first external-gear left-contrate-tooth combined gear 931, the first gear 911 and the second gear 930, the automatic transmission of the seventh embodiment further comprises: a third left-contrate-tooth combined fluted disc 1110, a second right-contrate-tooth combined fluted disc 1140, a third external-gear right-contrate-tooth combined gear 1100, a fourth gear 1101, a second external-gear left-contrate-tooth combined gear 1130 and a fifth gear 1120.

The third external-gear right-contrate-tooth combined gear 1100 has peripheral teeth and right contrate teeth, and the third external-gear right-contrate-tooth combined gear 1100 is loosely nested on the transmission output shaft 950; the third external-gear right-contrate-tooth combined gear 1100 and the fourth gear 1101 engage by peripheral teeth;

the fourth gear 1101 is fixedly connected to the transmission intermediate shaft 940 by a key.

The second external-gear left-contrate-tooth combined gear 1130 has peripheral teeth and left contrate teeth, and the second external-gear left-contrate-tooth combined gear 1130 is loosely nested on the transmission intermediate shaft 940; the second external-gear left-contrate-tooth combined gear 1130 and the fifth gear 1120 engage by peripheral teeth; the fifth gear 1120 is fixedly connected to the transmission output shaft 950 by a key.

The third left-contrate-tooth combined fluted disc 1110 comprises left contrate teeth; the third left-contrate-tooth combined fluted disc 1110 is installed on the transmission output shaft 950 by a key, and the third left-contrate-tooth combined fluted disc 1110 is able to turn synchronously with the transmission output shaft 950, and is able to axially move along the transmission output shaft 950.

The third left-contrate-tooth combined fluted disc 1110 further comprises a third left end electromagnet.

When the third left end electromagnet of the third left-contrate-tooth combined fluted disc 1110 is electrified, and the first left end electromagnet of the first left-contrate-tooth combined fluted disc 920 and the first right end electromagnet of the first right-contrate-tooth combined fluted disc 960 are not electrified, the first left-contrate-tooth combined fluted disc 920 and the first right-contrate-tooth combined fluted disc 960 are in an intermediate position, and after the third left-contrate-tooth combined fluted disc 1110 moves to the left to a specified position, the right contrate teeth of the third external-gear right-contrate-tooth combined gear 1100 and the left contrate teeth of the third left-contrate-tooth combined fluted disc 1110 engage.

At this point of time, the transmission input shaft 900 turns and drives the first external-gear right-contrate-tooth combined gear 910 to turn, then drives the first gear 911 to turn, and then drives the transmission intermediate shaft 940 to turn, and further drives the fourth gear 1101 that is fixedly connected to the transmission intermediate shaft 940 by a key to turn, and then drives the third external-gear right-contrate-tooth combined gear 1100 to turn. Because the right contrate teeth of the third external-gear right-contrate-tooth combined gear 1100 and the left contrate teeth of the third left-contrate-tooth combined fluted disc 1110 engage, the third left-contrate-tooth combined fluted disc 1110 and the transmission output shaft 950 are finally driven to turn. In this way, the input rotation speed and power of the transmission are transmitted to the transmission output shaft 950 via the input shaft 900, the first external-gear right-contrate-tooth combined gear 910, the first gear 911, the fourth gear 1101, the third external-gear right-contrate-tooth combined gear 1100 and the third left-contrate-tooth combined fluted disc 1110 of the transmission. At this point of time, one shift position of the four-speed transmission is realized.

The second right-contrate-tooth combined fluted disc 1140 further comprises a second right end electromagnet.

When the second right end electromagnet of the second right-contrate-tooth combined fluted disc 1140 is electrified, and the first left end electromagnet of the first left-contrate-tooth combined fluted disc 920 and the first right end electromagnet of the first right-contrate-tooth combined fluted disc 960 are not electrified, after the second right-contrate-tooth combined fluted disc 1140 moves to the right to a specified position, the left contrate teeth of the second external-gear left-contrate-tooth combined gear 1130 and the right contrate teeth of the second right-contrate-tooth combined fluted disc 1140 engage.

The transmission input shaft 900 turns and drives the first external-gear right-contrate-tooth combined gear 910 to turn, then drives the first gear 911 to turn, and then drives the intermediate shaft 940 to turn, and further drives the second right-contrate-tooth combined fluted disc 1140 that is installed on the transmission intermediate shaft 940 by a key. Because the right contrate teeth of the second right-contrate-tooth combined fluted disc 1140 and the left contrate teeth of the second external-gear left-contrate-tooth combined gear 1130 engage, the second external-gear left-contrate-tooth combined gear 1130 is driven to turn, and in turn the fifth gear 1120 and the output shaft 950 is driven to turn. In this way, the input rotation speed and power of the transmission are finally transmitted to the transmission output shaft 950 via the input shaft 900, the first external-gear right-contrate-tooth combined gear 910, the first gear 911, the transmission intermediate shaft 940, the second right-contrate-tooth combined fluted disc 1140, the second external-gear left-contrate-tooth combined gear 1130 and the fifth gear 1120 of the transmission. At this point of time, another shift position of the four-speed transmission is realized.

When the first left end electromagnet of the first left-contrate-tooth combined fluted disc 920 is electrified, and the first right end electromagnet of the first right-contrate-tooth combined fluted disc 960, the third left end electromagnet of the third left-contrate-tooth combined fluted disc 1110 and the second right end electromagnet of the second right-contrate-tooth combined fluted disc 1140 are not electrified, like in the fifth embodiment, the input rotation speed and power of the transmission are directly transmitted to the transmission output shaft 950 via the transmission input shaft 900. At this point of time, another shift position of the four-speed transmission is realized.

When the first right end electromagnet of the first right-contrate-tooth combined fluted disc 960 is electrified, and the first left end electromagnet of the first left-contrate-tooth combined fluted disc 920, the third left end electromagnet of the third left-contrate-tooth combined fluted disc 1110 and the second right end electromagnet of the second right-contrate-tooth combined fluted disc 1140 are not electrified, like in the fifth embodiment, the input rotation speed and power of the transmission are finally transmitted to the transmission output shaft 950 via the input shaft 900, the first external-gear right-contrate-tooth combined gear 910, the first gear 911, the transmission intermediate shaft 940, the first right-contrate-tooth combined fluted disc 960, the first external-gear left-contrate-tooth combined gear 931 and the second gear 930 of the transmission. At this point of time, still another shift position of the four-speed transmission is realized.

When none of the first left-contrate-tooth combined fluted disc 920, the first right-contrate-tooth combined fluted disc 960, the third left-contrate-tooth combined fluted disc 1110, the third left end electromagnet and the second right-contrate-tooth combined fluted disc 1140 is electrified, the transmission is in the neutral shift position.

It should be noted that, in each embodiment of the present invention, the transmission ratios and shift positions can be changed by changing the sizes and tooth numbers of gears, to adapt to different practical situations and demands.

Based on the above embodiments, it can be deduced that, a five-speed automatic transmission can be realized by adding one external-gear right-contrate-tooth combined gear, one gear and one double-contrate-tooth combined fluted disc on the basis of the seventh embodiment; a six-speed automatic transmission can be realized by adding one external-gear right-contrate-tooth combined gear, one external-gear left-contrate-tooth combined gear, two gears and one double-contrate-tooth combined fluted disc on the basis of the seventh embodiment. Thus the following technical solutions can be obtained by analogy:

When the automatic transmission shown in the fifth embodiment further comprises N first gear trains, a 2+(N*2) speed automatic transmission can be realized, wherein N is a positive integer greater than or equal to 1. For example, when N=1, the four-speed automatic transmission as shown in the seventh embodiment can be realized, and when N=2, the six-speed automatic transmission can be realized, and so on.

When the automatic transmission shown in the fifth embodiment further comprises N−1 first gear trains and one second gear train, a 2+((N−1)*2)+1 speed automatic transmission can be realized, wherein N is a positive integer greater than or equal to 1, and each of the first gear trains comprises: an external-gear right-contrate-tooth combined gear, an external-gear left-contrate-tooth combined gear, a gear one, a gear two, a left-contrate-tooth combined fluted disc and a right-contrate-tooth combined fluted disc; wherein, the external-gear right-contrate-tooth combined gear has peripheral teeth and right contrate teeth, and the external-gear right-contrate-tooth combined gear is loosely nested on the transmission output shaft 950; the external-gear right-contrate-tooth combined gear and the gear one engage by peripheral teeth; the gear one is fixedly connected to the transmission intermediate shaft 940; the external-gear left-contrate-tooth combined gear has peripheral teeth and left contrate teeth, and the external-gear left-contrate-tooth combined gear is loosely nested on the transmission output shaft 950; the external-gear left-contrate-tooth combined gear and the gear two engage by peripheral teeth; the gear two is fixedly connected to the transmission intermediate shaft 940; the left-contrate-tooth combined fluted disc is installed on the transmission output shaft 950, is able to turn synchronously with the transmission output shaft 950, and is able to axially move along the transmission output shaft 950; the right-contrate-tooth combined fluted disc is installed on the transmission intermediate shaft 940, is able to turn synchronously with the transmission intermediate shaft 940, and is able to axially move along the transmission intermediate shaft 940.

The second gear train comprises: an external-gear right-contrate-tooth combined gear, a gear three and a contrate-tooth combined fluted disc; the external-gear right-contrate-tooth combined gear has peripheral teeth and right contrate teeth, and the external-gear right-contrate-tooth combined gear is loosely nested on the transmission output shaft 950; the external-gear right-contrate-tooth combined gear and the gear three engage by peripheral teeth; the gear three is fixedly connected to the transmission intermediate shaft 940; the contrate-tooth combined fluted disc comprises left contrate teeth; the contrate-tooth combined fluted disc is installed on the transmission output shaft 950, is able to turn synchronously with the transmission output shaft 950, and is able to axially move along the transmission output shaft 950. For example, when N=1, the three-speed automatic transmission as shown in the sixth embodiment can be realized, and when N=2, a five-speed automatic transmission can be realized, and so on.

Finally, it should be further emphasized that, in the above embodiments of the present invention, the gear-shift controlling mechanism of the automatic transmission is illustrated with the example of the built-in electromagnetic actuating mechanism. However, in other embodiments of the present invention, the gear-shift controlling mechanism may also be an outboard hydraulic, pneumatic or electrical actuating mechanism, to position the double-contrate-tooth combined fluted disc and the single contrate-tooth combined fluted disc, and in turn realize gear shift controlling. As the special implementing modes are understood and known by a person skilled in the art, they are not described in detail here.

In conclusion, the present invention has the following advantageous effects:
1. Compared with the traditional AMT, in the present invention, by employing the double-contrate-tooth combined fluted disc as the gear shifting element, a synchronizer is not needed. Therefore, the structure is simple, the reliability is increased, the gear shift duration is shortened, the shifting shock is relatively small, the manufacturing cost is low, and it is easy to realize industrialization.
2. The transmission of the present invention has simple arrangement of gears, short axial dimension and small weight, and occupies small room. Thus, gear shifting is quick, and the reliability is high.
3. The automatic transmission of the present invention can be conveniently expanded to three-speed, four-speed, five-speed, six-speed transmissions and so on.

The description above is merely embodiments of the present invention, and not used to limit the protection scope of the present invention. Any modification, equivalent substitution, improvement or expansion made within the spirit and principle of the present invention are all included in the protection scope of the present invention.

What is claimed is:
1. An automatic transmission, wherein comprises:
a first left-contrate-tooth combined fluted disc, a first right-contrate-tooth combined fluted disc and a two stage transmission ordinary gear train; and
the two stage transmission ordinary gear train comprises: a transmission input shaft, a transmission intermediate shaft, a transmission output shaft, a first external-gear right-contrate-tooth combined gear, a first external-gear left-contrate-tooth combined gear, a first gear and a second gear;
wherein, the transmission input shaft, the transmission intermediate shaft and the transmission output shaft are paralleled arranged; the first external-gear right-contrate-tooth combined gear is fixedly connected to the transmission input shaft by a key, the first external-gear right-contrate-tooth combined gear and the first gear engage by peripheral teeth, and the first gear is fixedly connected to the transmission intermediate shaft by a key; the second gear is fixedly connected to the transmission output shaft by a key, the second gear and the first external-gear left-contrate-tooth combined gear engage by peripheral teeth, and the first external-gear left-contrate-tooth combined gear is loosely nested on the transmission intermediate shaft;
the first left-contrate-tooth combined fluted disc is able to turn synchronously with the transmission output shaft, and is able to axially move along the transmission output shaft; the first right-contrate-tooth combined fluted disc is able to turn synchronously with the transmission intermediate shaft, and is able to axially move along the transmission intermediate shaft;
the first external-gear right-contrate-tooth combined gear further has right contrate teeth; after the first left-contrate-tooth combined fluted disc moves to the left to a specified position, the right contrate teeth of the first external-gear right-contrate-tooth contrate-tooth com- bined gear and the left contrate teeth of the first left-contrate-tooth combined fluted disc engage;

the first external-gear left-contrate-tooth combined gear further has left contrate teeth; after the first right-contrate-tooth combined fluted disc moves to the right to a specified position, the left contrate teeth of the first external-gear left-contrate-tooth combined gear and the right contrate teeth of the first right-contrate-tooth combined fluted disc engage; and when the first left-contrate-tooth combined fluted disc and the first right-contrate-tooth combined fluted disc are in an intermediate position, the first left-contrate-tooth combined fluted disc does not engage with the right contrate teeth of the first external-gear right-contrate-tooth combined gear, and the first right-contrate-tooth combined fluted disc does not engage with the left contrate teeth of the first external-gear left-contrate-tooth combined gear.

2. The automatic transmission according to claim 1, wherein the automatic transmission further comprises a gear-shift controlling mechanism;

the gear-shift controlling mechanism is a built-in electromagnetic actuating mechanism; or, the gear-shift controlling mechanism is an outboard hydraulic, pneumatic or electrical actuating mechanism; and when the gear-shift controlling mechanism is a built-in electromagnetic actuating mechanism, the gear-shift controlling mechanism specially comprises a first left end electromagnet that is installed on the first left-contrate-tooth combined fluted disc and a first right end electromagnet that is installed on the first right-contrate-tooth combined fluted disc; wherein when the first left end electromagnet is electrified, the first left-contrate-tooth combined fluted disc moves to the left to the specified position; when the first right end electromagnet is electrified, the first right-contrate-tooth combined fluted disc moves to the right to the specified position.

3. The automatic transmission according to claim 1, wherein the intertooth spaces and tooth slots of the left contrate teeth of the first left-contrate-tooth combined fluted disc, the right contrate teeth of the first right-contrate-tooth combined fluted disc and the first external-gear right-contrate-tooth combined gear and the left contrate teeth of the first external-gear left-contrate-tooth combined gear are all rectangular.

4. The automatic transmission according to claim 1, wherein the automatic transmission further comprises: a second left-contrate-tooth combined fluted disc, a second external-gear right-contrate-tooth combined gear and a third gear;

wherein, the second external-gear right-contrate-tooth combined gear has peripheral teeth and right contrate teeth, and the second external-gear right-contrate-tooth combined gear is loosely nested on the transmission output shaft; the second external-gear right-contrate-tooth combined gear and the third gear engage by peripheral teeth; the third gear is fixedly connected to the transmission intermediate shaft by a key;

the second left-contrate-tooth combined fluted disc comprises left contrate teeth; the second left-contrate-tooth combined fluted disc is installed on the transmission output shaft by a key, and the second left-contrate-tooth combined fluted disc is able to turn synchronously with the transmission output shaft, and is able to axially move along the transmission output shaft;

after the second left-contrate-tooth combined fluted disc moves to the left to a specified position, the right contrate teeth of the second external-gear right-contrate-tooth combined gear and the left contrate teeth of the second left-contrate-tooth combined fluted disc engage; and when the second left-contrate-tooth combined fluted disc is in an intermediate position, the second left-contrate-tooth combined fluted disc does not engage with the right contrate teeth of the second external-gear right-contrate-tooth combined gear.

5. The automatic transmission according to claim 1, wherein the automatic transmission further comprises: a third left-contrate-tooth combined fluted disc, a second right-contrate-tooth combined fluted disc, a third external-gear right-contrate-tooth combined gear, a fourth gear, a second external-gear left-contrate-tooth combined gear and a fifth gear;

wherein, the third external-gear right-contrate-tooth combined gear has peripheral teeth and right contrate teeth, and the third external-gear right-contrate-tooth combined gear is loosely nested on the transmission output shaft; the third external-gear right-contrate-tooth combined gear and the fourth gear engage by peripheral teeth; the fourth gear is fixedly connected to the transmission intermediate shaft by a key;

the second external-gear left-contrate-tooth combined gear has peripheral teeth and left contrate teeth, and the second external-gear left-contrate-tooth combined gear is loosely nested on the transmission intermediate shaft; the second external-gear left-contrate-tooth combined gear and the fifth gear engage by peripheral teeth; and the fifth gear is fixedly connected to the transmission output shaft by a key;

the third left-contrate-tooth combined fluted disc comprises left contrate teeth; the third left-contrate-tooth combined fluted disc is installed on the transmission output shaft by a key, and the third left-contrate-tooth combined fluted disc is able to turn synchronously with the transmission output shaft, and is able to axially move along the transmission output shaft;

after the third left-contrate-tooth combined fluted disc moves to the left to a specified position, the right contrate teeth of the third external-gear right-contrate-tooth combined gear and the left contrate teeth of the third left-contrate-tooth combined fluted disc engage;

the second right-contrate-tooth combined fluted disc comprises right contrate teeth; the second right-contrate-tooth combined fluted disc is installed on the transmission intermediate shaft by a key, and the second right-contrate-tooth combined fluted disc is able to turn synchronously with the transmission intermediate shaft, and is able to axially move along the transmission intermediate shaft;

after the second right-contrate-tooth combined fluted disc moves to the right to a specified position, the left contrate teeth of the second external-gear left-contrate-tooth combined gear and the right contrate teeth of the second right-contrate-tooth combined fluted disc engage; and when the third left-contrate-tooth combined fluted disc and the second right-contrate-tooth combined fluted disc are in an intermediate position, the third left-contrate-tooth combined fluted disc does not engage with the right contrate teeth of the third external-gear right-contrate-tooth combined gear, and the second right-contrate-tooth combined fluted disc engage with the left contrate teeth of the second external-gear left-contrate-tooth combined gear.

6. The automatic transmission according to claim 1, wherein the automatic transmission further comprises N first gear trains, to realize a 2+(N*2) speed automatic transmission;

or, the automatic transmission further comprises N−1 first gear trains and one second gear train, to realize a 2+((N−1)*2)+1 speed automatic transmission;

wherein N is a positive integer greater than or equal to 1, each of the first gear trains comprises: an external-gear right-contrate-tooth combined gear, an external-gear left-contrate-tooth combined gear, a gear one, a gear two, a left-contrate-tooth combined fluted disc and a right-contrate-tooth combined fluted disc; wherein, the external-gear right-contrate-tooth combined gear has peripheral teeth and right contrate teeth, and the external-gear right-contrate-tooth combined gear is loosely nested on the transmission output shaft; the external-gear right-contrate-tooth combined gear and the gear one engage by peripheral teeth; the gear one is fixedly connected to the transmission intermediate shaft; the external-gear left-contrate-tooth combined gear has peripheral teeth and left contrate teeth, and the external-gear left-contrate-tooth combined gear is loosely nested on the transmission output shaft; the external-gear left-contrate-tooth combined gear and the gear two engage by peripheral teeth; the gear two is fixedly connected to the transmission intermediate shaft; the left-contrate-tooth combined fluted disc is installed on the transmission output shaft, is able to turn synchronously with the transmission output shaft, and is able to axially move along the transmission output shaft; the right-contrate-tooth combined fluted disc is installed on the transmission intermediate shaft, is able to turn synchronously with the transmission intermediate shaft, and is able to axially move along the transmission intermediate shaft; and the second gear train comprises: an external-gear right-contrate-tooth combined gear, a gear three and a contrate-tooth combined fluted disc; wherein, the external-gear right-contrate-tooth combined gear has peripheral teeth and right contrate teeth, and the external-gear right-contrate-tooth combined gear is loosely nested on the transmission output shaft; the external-gear right-contrate-tooth combined gear and the gear three engage by peripheral teeth; the gear three is fixedly connected to the transmission intermediate shaft; the contrate-tooth combined fluted disc comprises left contrate teeth; the contrate-tooth combined fluted disc is installed on the transmission output shaft, is able to turn synchronously with the transmission output shaft, and is able to axially move along the transmission output shaft.

* * * * *